United States Patent [19]

Hoyer et al.

[11] Patent Number: 4,916,215

[45] Date of Patent: Apr. 10, 1990

[54] WATER-SOLUBLE DISAZO COMPOUNDS CONTAINING SUBSTITUTED TRIAZINYL RADICAL, PYRAZOLE-TYPE GROUPS, AND A PLURALITY OF FIBER-REACTIVE SULFONE-CONTAINING GROUPS, SUITABLE AS DYESTUFFS

[75] Inventors: Ernst Hoyer, Frankfurt am Main; Rudolf Fass, Kelkheim, both of Fed. Rep. of Germany

[73] Assignee: Hoechst Aktiengesellschaft, Frankfurt am Main, Fed. Rep. of Germany

[21] Appl. No.: 177,893

[22] Filed: Mar. 29, 1988

Related U.S. Application Data

[63] Continuation of Ser. No. 647,025, Sep. 4, 1984, abandoned, which is a continuation of Ser. No. 490,151, Apr. 29, 1983, abandoned.

[30] Foreign Application Priority Data

May 8, 1982 [DE] Fed. Rep. of Germany ....... 3217312

[51] Int. Cl.[4] .......................... D06P 1/02; D06P 1/38; C09B 62/08; C09B 62/82
[52] U.S. Cl. .................................. 534/636; 534/582; 534/598; 534/887; 544/208
[58] Field of Search .......................................... 534/636

[56] References Cited

U.S. PATENT DOCUMENTS

| | | | |
|---|---|---|---|
| 3,223,470 | 12/1965 | Boedeker et al. | 260/163 X |
| 4,242,258 | 12/1980 | Noll et al. | 260/152 |
| 4,378,312 | 3/1983 | Hoyer et al. | 260/153 |

FOREIGN PATENT DOCUMENTS

| | | | |
|---|---|---|---|
| 2748929 | 5/1979 | Fed. Rep. of Germany | 260/153 |
| 2407960 | 6/1979 | France | 534/637 |
| 2007698 | 5/1979 | United Kingdom | 534/637 |
| 2008143 | 5/1979 | United Kingdom | 534/637 |

Primary Examiner—Floyd D. Higel

[57] ABSTRACT

Water-soluble disazo compounds of the general formula

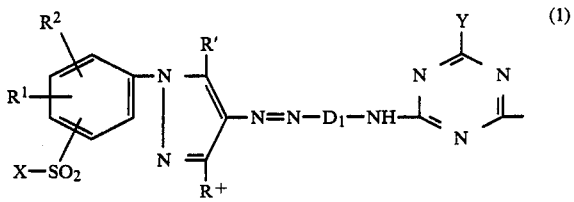

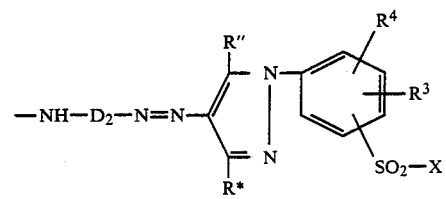

in which $D_1$ and $D_2$ are each a phenylene or naphthylene radical which can be substituted by 1 or 2 substituents from the group consisting of 1 chlorine, 1 bromine, 2 sulfo, 2 carboxyl, 2 alkyl of 1 to 4 carbon atoms and 2 alkoxy of 1 to 4 carbon atoms, $R'$ and $R''$ each denote an amino or hydroxyl group, $R+$ and $R*$ each represent methyl, carboxyl or lower carbalkoxy, $R^1$ and $R^3$ are each hydrogen, lower alkyl, lower alkoxy, chlorine or bromine, $R^2$ and $R^4$ each denote hydrogen, lower alkyl, lower alkoxy or chlorine, X denotes a vinyl, $\beta$-sulfatoethyl,$\beta$-thiosulfatoethyl or $\beta$-chloroethyl group and Y is a chlorine, fluorine or bromine atom or a sulfo, hydroxyl, aliphatic or aromatic ether group or thioether group or a primary, secondary or tertiary amino group. These disazo compounds have fiber-reactive dyestuff properties and produce on hydroxyl- and/or carboxamide-containing material, in particular fiber material, such as cellulosic fibers, strong dyeings having good fastness properties.

11 Claims, No Drawings

WATER-SOLUBLE DISAZO COMPOUNDS CONTAINING SUBSTITUTED TRIAZINYL RADICAL, PYRAZOLE-TYPE GROUPS, AND A PLURALITY OF FIBER-REACTIVE SULFONE-CONTAINING GROUPS, SUITABLE AS DYESTUFFS

CROSS REFERENCE TO RELATED APPLICATIONS

This is a continuation of our copending application Ser. No. 647,025, filed Sept. 4, 1984, now abandoned, which is a continuation of Ser. No. 490,151, filed Apr. 29, 1983, and now abandoned.

The invention relates to the field of fiber-reactive disazo dyestuffs.

German Offenlegungsschrift No. 2,748,929 discloses dyestuffs which are disazo compounds which contain a chlorotriazinyl radical which is bonded with amino groups to azo compound radicals which contain a fiber-reactive groups of the vinylsulfonyl series and a pyrazolonyl radical as coupling component.

We have now found new valuable and advantageous water-soluble disazo compounds which have the general formula (1)

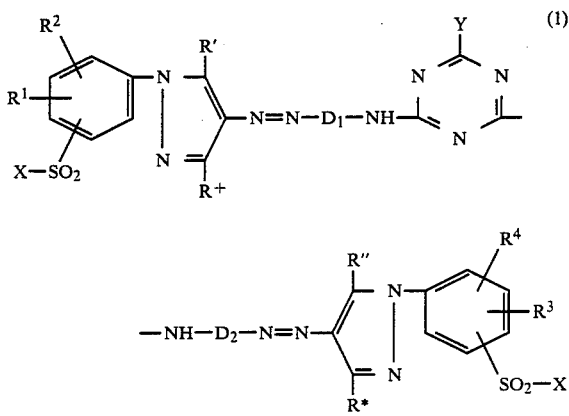

in which $D_1$ is a phenylene radical, preferably an m- or p-phenylene radical, or a naphthylene radical which can both be substituted by one or two substituents selected from the group consisting of one chlorine atom, one bromine atom, two sulfo groups (of the general formula $-SO_3M$ where M has the meaning given below), two carboxyl groups (of the general formula $-COOM$ where M has the meaning given below), two alkyl groups of 1 to 4 carbon atoms and two alkoxy groups of 1 to 4 carbon atoms, $D_2$ is a phenylene radical, preferably an m- or p-phenylene radical, or a naphthylene radical which can both substituted by one or two substituents selected from the group consisting of one chlorine atom, one bromine atom, two sulfo groups (of the general formula $-SO_3M$ where M has the meaning given below), two carboxyl groups (of the general formula $-COOM$ where M has the meaning given below), two alkyl groups of 1 to 4 carbon atoms and two alkoxy groups of 1 to 4 carbon atoms, where $D_1$ and $D_2$ can be identical to or different from each other, M is a hydrogen atom or one equivalent of a metal, preferably of a monovalent or divalent metal, such as of an alkali or alkaline earth metal, in particular of sodium, potassium or calcium, R' is an amino group or, preferably, a hydroxyl group, R'' is an amino group or, preferably, a hydroxyl group, where R' and R'' can be identical to or different from each other, $R^+$ is a methyl group or a carboxyl group or a carbalkoxy group of 2 to 5 carbon atoms, such as a carbethoxy group or a carbomethoxy group, $R^*$ is a methyl group or a carboxyl group or a carbalkoxy group of 2 to 5 carbon atoms, such as a carbethoxy group or a carbomethoxy group, where $R+$ and $R^*$ can be identical to or different from each other, $R^1$ is a hydrogen atom, an alkyl group of 1 to 4 carbon atoms, an alkoxy group of 1 to 4 carbon atoms, a chlorine atom or a bromine atom, $R^2$ is a hydrogen atom, an alkyl group of 1 to 4 carbon atoms, an alkoxy group of 1 to 4 carbon atoms or a chlorine atom, $R^3$ is a hydrogen atom, an alkyl group of 1 to 4 carbon atoms, an alkoxy group of 1 to 4 carbon atoms, a chlorine atom or a bromine atom, $R^4$ is a hydrogen atom, an alkyl group of 1 to 4 carbon atoms, an alkoxy group of 1 to 4 carbon atoms or a chlorine atom, where $R^1$, $R^2$, $R^3$ and $R^4$ can be identical to or different from one another, X is a vinyl group or a β-sulfatoethyl group (of the general formula $-CH_2-CH_2-OSO_3M$ where M has the above-mentioned meaning) or a β-thiosulfatoethyl group (of the general formula $-CH_2-CH_2-S-SO_3M$ where M has the above-mentioned meaning) or a β-chloroethyl group, where the two X in the formula (1) can be identical to or different from each other, Y is a chlorine, fluorine or bromine atom or a sulfo group or a group of the formula (2a), (2b) or (2c)

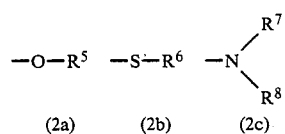

in which $R^5$ is a hydrogen atom, an optionally substituted aliphatic radical or an optionally substituted aryl radical;

$R^5$ is preferably a hydrogen atom or an alkyl group which has 1 to 4 carbon atoms and can be substituted, for example by one or two substituents which belong to the group consisting of alkoxy of 1 to 4 carbon atoms, sulfo, carboxyl, hydroxyl, sulfato (of the general formula $-OSO_3M$ where M has the abovementioned meaning), phenyl, phenyl substituted by alkyl of 1 to 4 carbon atoms, alkoxy of 1 to 4 carbon atoms, nitro, sulfo, carboxyl and/or chlorine, naphthyl and naphthyl substituted by alkyl of 1 to 4 carbon atoms, alkoxy of 1 to 4 carbon atoms, nitro, sulfo, carboxyl and/or chlorine, or is a phenyl radical or a naphthyl radical or a phenyl radical substituted by alkyl of 1 to 4 carbon atoms, alkoxy of 1 to 4 carbon atoms, nitro, sulfo, carboxyl and/or chlorine or a naphthyl radical substituted by alkyl of 1 to 4 carbon atoms, alkoxy of 1 to 4 carbon atoms, sulfo, carboxyl and/or chlorine, $R^6$ is an optionally substituted aliphatic radical or an optionally substituted aryl radical or an aromatic heterocyclic radical; $R^6$ is preferably an alkyl group which has 1 to 4 carbon atoms and can be substituted, for example by one or two substituents which belong to the group consisting of alkoxy of 1 to 4 carbon atoms, sulfo, carboxyl, hydroxyl, sulfato (of the general formula —$OSO_3M$ where M has the abovementioned meaning), phenyl, phenyl substituted by alkyl of 1 to 4 carbon atoms, alkoxy of 1 to 4 carbon atoms, nitro, sulfo, carboxyl and/or chlorine, naphthyl and naphthyl substituted by alkyl of 1 to 4 carbon atoms, alkoxy of 1 to 4 carbon atoms, nitro, sulfo, carboxyl and/or chlorine, or is a phenyl radical or a naphthyl radical or a phenyl radical substituted by alkyl of 1 to 4 carbon atoms, alkoxy of 1 to 4 carbon atoms, nitro, sulfo, carboxyl and/or chlorine or a naphthyl radical substituted by alkyl of 1 to 4 carbon atoms, alkoxy of 1 to 4 carbon atoms, sulfo, carboxyl and/or chlorine or is a benzothiazol-2-yl radical which can be substituted in the carbocyclic part by an alkyl group of 1 to 4 carbon atoms, an alkoxy group of 1 to 4 carbon atoms, a chlorine atom or a sulfo group, $R^7$ is a hydrogen atom, an optionally substituted aliphatic radical or an optionally substituted cycloaliphatic radical; $R^7$ preferably is a hydrogen atom or an alkyl group which has 1 to 4 carbon atoms and can be substituted, for example by one or two substituents which belong to the group consisting of alkoxy of 1 to 4 carbon atoms, sulfo, carboxyl, sulfato, phenyl and phenyl substituted by alkyl of 1 to 4 carbon atoms, alkoxy of 1 to 4 carbon atoms, sulfo, carboxyl and/or chlorine, or isa cyclopentyl or cyclohexyl radical which is optionally substituted by 1 to 3 methyl groups, $R^8$ is a hydrogen atom, an optionally substituted aliphatic radical or an optionally substituted aryl radical;

$R^8$ is preferably a hydrogen atom or an alkyl group which can be substituted, for example by one or two substituents which belong to the group consisting of alkoxy of 1 to 4 carbon atoms, sulfo, carboxyl, hydroxyl, sulfato and phenyl substituted by alkyl of 1 to 4 carbon atoms, alkoxy of 1 to 4 carbon atoms, sulfo, carboxyl and/or chlorine, or is a phenyl radical which can be substituted by one or two substituents which belong to the group consisting of hydroxyl, carboxyl, sulfo, alkyl of 1 to 4 carbon atoms, alkoxy of 1 to 4 carbon atoms and chlorine, or is a naphthyl radical which can be substituted by one, two or three substituents from the group consisting of hydroxyl, carboxyl, sulfo, alkyl of 1 to 4 carbon atoms, alkoxy of 1 to 4 carbon atoms and chlorine, or is a hydroxyl group or an optionally substituted amino group, such as the amino group itself or a phenylamino group or an alkylamino group having an alkyl radical of 1 to 4 carbon atoms, where $R^7$ and $R^8$ can be identical to or different from each other, or $R^7$ and $R^8$, together with the nitrogen atom, form a 5-, 6- or 7-membered saturated heterocyclic ring which optionally includes one or two further heteroatoms, such as, for example, a nitrogen, oxygen or sulfur atom, such as, in particular, a morpholine, piperidine or piperazine ring.

The moieties ($R^+$, $R^*$, $R^1$, $R^2$, $R^3$, $R^4$, X, Y, $R^5$, $R^6$, $R^7$, $R^8$, R' and R'') in the general formula (1) can be quite generally identical to or different from one another.

Each of $R^+$ and $R^*$ is preferably a methyl group, a carboxyl group or a carbomethoxy group.

Each of $R^1$ and $R^3$ is preferably a hydrogen atom or an alkoxy group of 1 to 4 carbon atoms or a chlorine or bromine atom.

Each of $R^2$ and $R^4$ is preferably a hydrogen atom, an alkyl group of 1 to 4 carbon atoms or an alkoxy group of 1 to 4 carbon atoms.

Each of $D_1$ and $D_2$ is preferably a meta- or para-phenylene radical which can be substituted by one or two substituents selected from the group consisting of one chlorine atom, one carboxyl group, two alkyl groups of 1 to 4 carbon atoms, two alkoxy groups of 1 to 4 carbon atoms and two sulfo groups or a naphthylene radical which can be substituted by one or two sulfo groups.

$R^5$ is particularly preferably a hydrogen atom, an alkyl group of 1 to 4 carbon atoms or a phenyl radical. $R^6$ is particularly preferably an alkyl group of 1 to 4 carbon atoms, a β-hydroxyethyl group, a carboxymethyl group, a phenyl radical or a dinitrophenyl radical. $R^7$ is preferably a hydrogen atom, an alkyl group of 1 to 4 carbon atoms, a β-hydroxyethy6l, β-sulfatoethyl, βsulfoethyl, β-methoxyethyl or carboxymethyl group, or a carboxyethyl group, a phenyl radical or phenyl radicals which are substituted by carboxyl and/or sulfo groups. $R^8$ is particularly preferably a hydrogen atom, an alkyl group of 1 to 4 carbon atoms, a β-hydroxyethyl group or a β-methoxyethyl group.

Of the alkyl groups of 1 to 4 carbon atoms which can be present in compounds of the general formula (1), the ethyl group and, in particular, the methyl group are preferred. Of alkoxy groups of 1 to 4 carbon atoms which can be present in compounds of the general formula (1), the ethoxy group and, in particular, the methoxy group are preferred.

In addition to the sulfo group and the chlorine, bromine or fluorine atom, the following radicals of the general formulae (2a), (2b) and (2c) (the radicals are in the form of the free acid) are noteworthy for the moiety Y:

—O—$CH_3$, —O—$C_2H_5$, —O—$CH_2$—$CH_2$—$CH_3$, —OH,

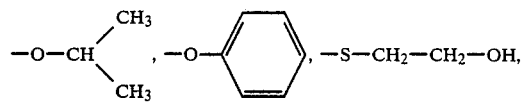

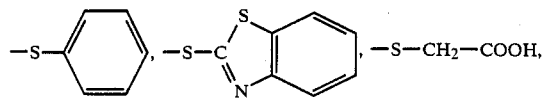

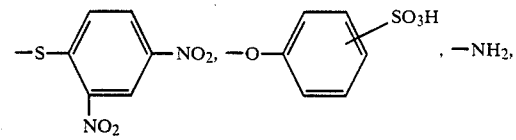

—NH—$CH_3$, —$NHC_2H_5$, —$NHC_3H_7$, 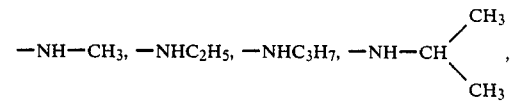

—NH—$CH_2$—$CH_2$—OH, —NH—$CH_2$—$CH_2$—$OSO_3H$,

-continued

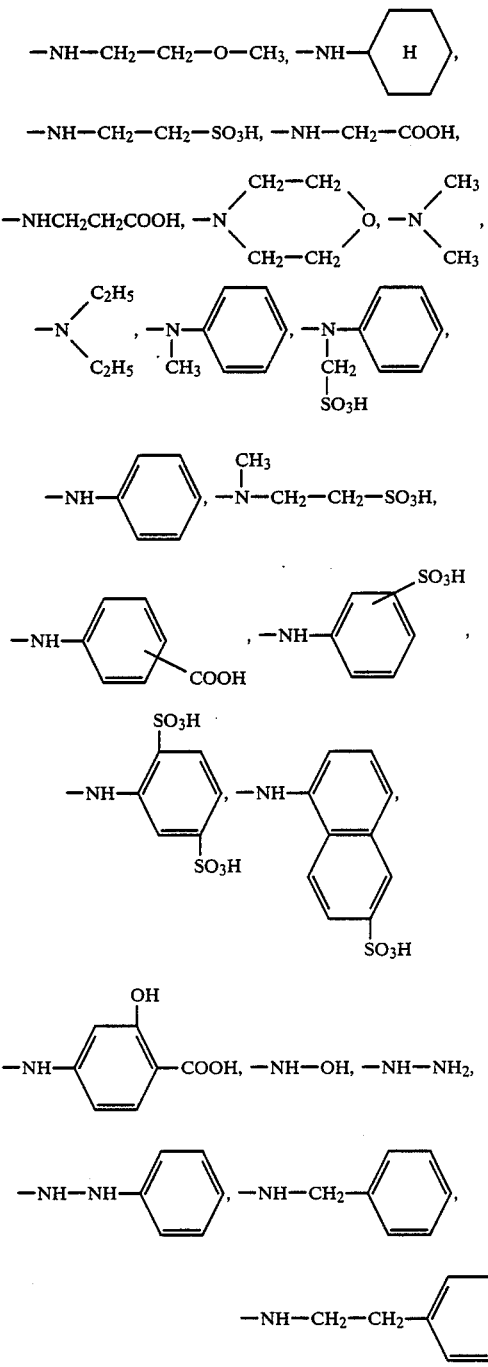

However, Y is preferably a fluorine atom or, in particular, a chlorine atom.

The moiety X is preferably a vinyl group or, in particular, a β-sulfatoethyl group.

The disazo compounds of the invention can be in the form of their free acid or in the form of their salts, in particular neutral slats; they are preferably in the form of their salts, of which in particular the alkali and alkaline earth metal salts, for example the sodium, potassium or calcium salts may be mentioned. The new compounds are preferably used in the form of these salts for dyeing or printing hydroxyl- and/or carboxamide-containing material, preferably fiber material.

The present invention also relates to processes for preparing these disazo compounds of the invention. These processes comprise tetrazotizing a diamino compound of the general formula (3)

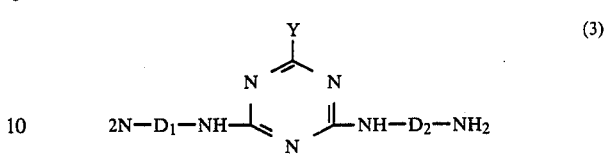

in which $D_1$, $D_2$ and Y have the abovementioned meanings, and reacting (coupling) the tetrazotized product with a compound of the general formula (4a) serving as a coupling components and with a compound of the general formula (4b) serving as a coupling component

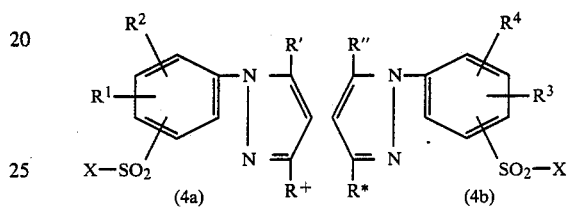

in which $R^+$, $R^*$, $R'$, $R''$, $R^1$, $R^2$, $R^3$, $R^4$ and the two X have the abovementioned meanings, which can be identical to or different from one another, thus with two identical or different coupling components, in equivalent amounts, or reacting (condensing) an aminoazo compound of the general formula (5a) and an aminoazo compound of the general formula (5b)

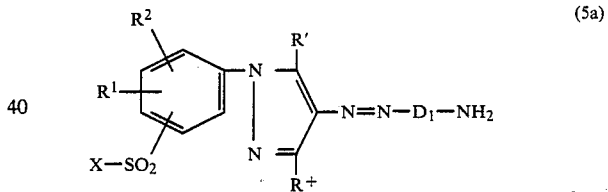

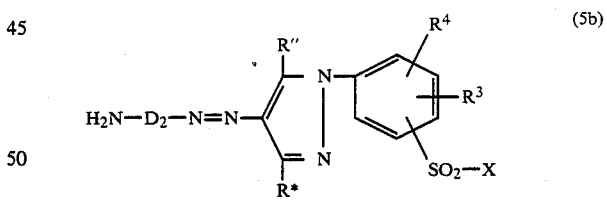

in which $D_1$, $D_2$, $R'$, $R''$, $R^+$, $R^*$, $R^1$, $R^2$, $R^3$ and $R^4$ and the two Xs have the abovementioned meanings and can be identical to or different from one another, thus two identical or different aminoazo compounds, in equivalent amounts with a trihalogenotriazine or a dihalogenotriazine compound of the general formula (6)

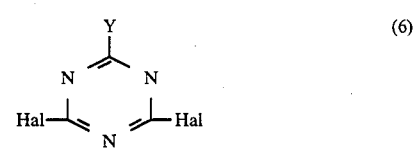

in which Y has the abovementioned meaning and each Hal denotes a chlorine, bromine or fluorine atom, or diazotizing an aminoazo compound of the general formula (7)

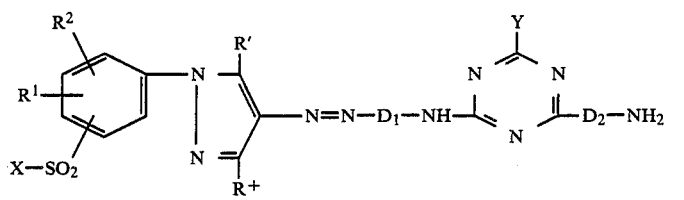

in which $D_1$, $D_2$, $R'$, $R+$, $R^1$, $R^2$, $Y$ and $X$ have the abovementioned meanings, and coupling the diazotized product with a compound of the general formula (4b) mentioned and defined above in which each of the moieties $R*$, $R''$, the corresponding moiety in the formula (7).

The diamino compounds of the general formula (3) are known, for example, from German Patent Nos.436,179 and 485,185. The coupling components of the general formula (4a) and (4b) have also been extensively described in the literature for fiber-reactive dyestuffs of the vinyl-sulfonyl series. The aminoazo compounds of the general formulae (5a) and (5b) are also known and can be prepared in analogy to a known method by monodiazotizing a diamine of the general formula $H_2N—D_1—NH_2$ or $H_2N—D_2-NH_2$ where $D_1$ and $D_2$ have the abovementioned meaning, and coupling the diazotized product with a coupling component of the above formula (4a) or (4b).

The trihalogenotriazine and dihalogenotriazine compounds of the general formula (6) are also known, and their preparation has been extensively described in the literature. A review can be found in the company publication "Produkstudie Cyanurchlorid" [a survey of cyanuric chloride] from Süddeutsche Kalkstickstoff-Werke (SKW), Trostberg, October 1976 (1st edition).

If the coupling components of the general formula (4a) and (4b) which are used in the above process variants differ from each other, they can be reacted with the diamine of the general formula (3) either in a mixture with each other or in succession. If the aminoazo compounds of the general formula (5a) and (5b) which are used in the above process variants differ from each other, they can be reacted with the trihalogenotriazine or dihalogenotriazine compound of the general formula (6) either in a mixture with each other or in succession. Carrying out these reactions with mixtures of these compounds (4a) and (4b) or (5a) and (5b) gives mixtures of three novel compounds of the general formula (1), i.e. two symmetrical compounds and one asymmetrical compound of the general formula (1).

The diazotization and tetrazotization of the amino and diamino compounds of the general formula (7) and (3) respectively and the subsequent coupling reactions of the processes of the invention which are described above follow generally known methods, However, in the case of the coupling reaction care should be taken to ensure that, to prevent damage to the fiber-reactive groups, neither the starting materials nor the end products are processed under relatively strong alkaline conditions. The diazotized amines are preferably coupled with the coupling components of the formulae (4) within a pH range between 3 and 7 and at a temperature between $-5°$ C. and $+30°$ C.

The condensation reactions which can be carried out in accordance with the procedure of the invention also follow known methods, thus preferably in an aqueous solution, in the absence or presence of organic solvents at room temperature (15° to 25° C.) or elevated temperatures (up to 120° C.) in the manner familiar to those skilled in the art. Examples of organic solvents which can be used in these condensation reactions are acetone and toluene. Condensation reactions in which a cyanuric halide itself is a reactant are preferably carried out at a temperature between 0 and 20° C. at pH 2–6. Dihalogenotriazine compounds of the general formula (6) in which Y does not represent a halogen atom are preferably reacted with an aminoazo compound of the general formula (5a) or (5b), via replacement of a second halogen atom, at a temperature between 15° and 70° C. at pH 4–5.5.

Examples of the aromatic diamines of the above-mentioned general formulae $H_2N—D_1—NH_2$ and $H_2N—D_2—NH_2$ which are used as starting compounds are 1,4-diaminobenzene-2-sulfonic acid, 1,4-diaminobenzene-2,5-disulfonic acid, 1,3-diaminobenzene-4-sulfonic acid, 1,4-diaminobenzene-2,6-disulfonic acid, 1,3-diamino-2-methylbenzene-5-sulfonic acid, 1,4-diaminobenzene, 1,3-diaminobenzene, 1,3-diamino-4-chlorobenzene, 1,3-diamino-4-methylbenzene, 2,6-diaminonaphthalene-4,8-disulfonic acid, 1,5-diaminonaphthalene-3,7-disulfonic acid, 1,3-diaminobenzene-4-carboxylic acid, 1,3-diamino-4-methoxybenzene, 2-chloro-1,3-diaminobenzene-5-sulfonic acid, 2-chloro-1,4-diaminobenzene-6-sulfonic acid, 2,5-diaminotoluene-4-sulfonic acid, 2,4-diaminotoluene-6-sulfonic acid, 2,4-diaminotoluene-5-sulfonic acid and 1,3-diaminobenzene-4,6-disulfonic acid.

The following compounds are technically interesting examples of diamino compounds of the general formula (3) which, too, serve as starting compounds:

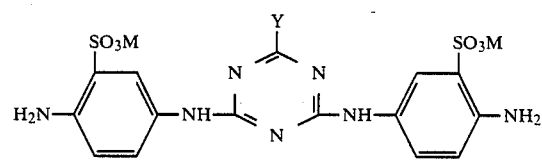

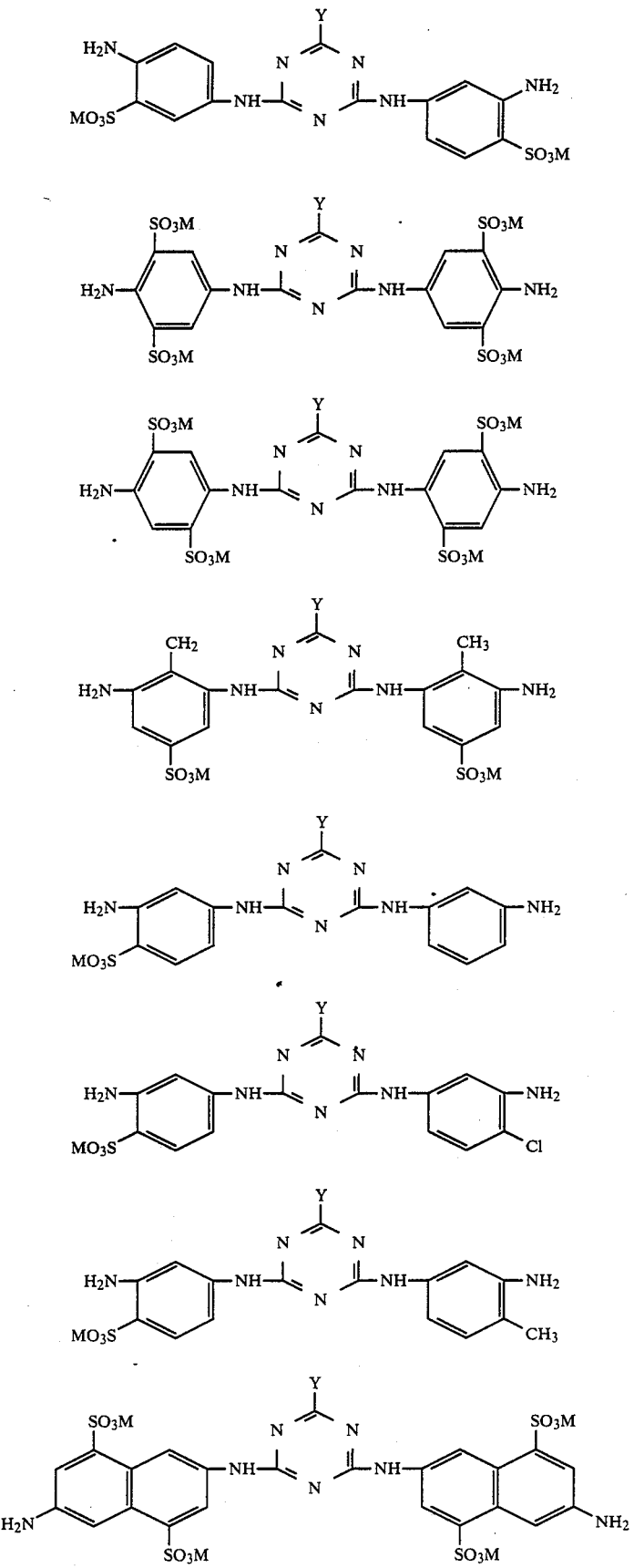

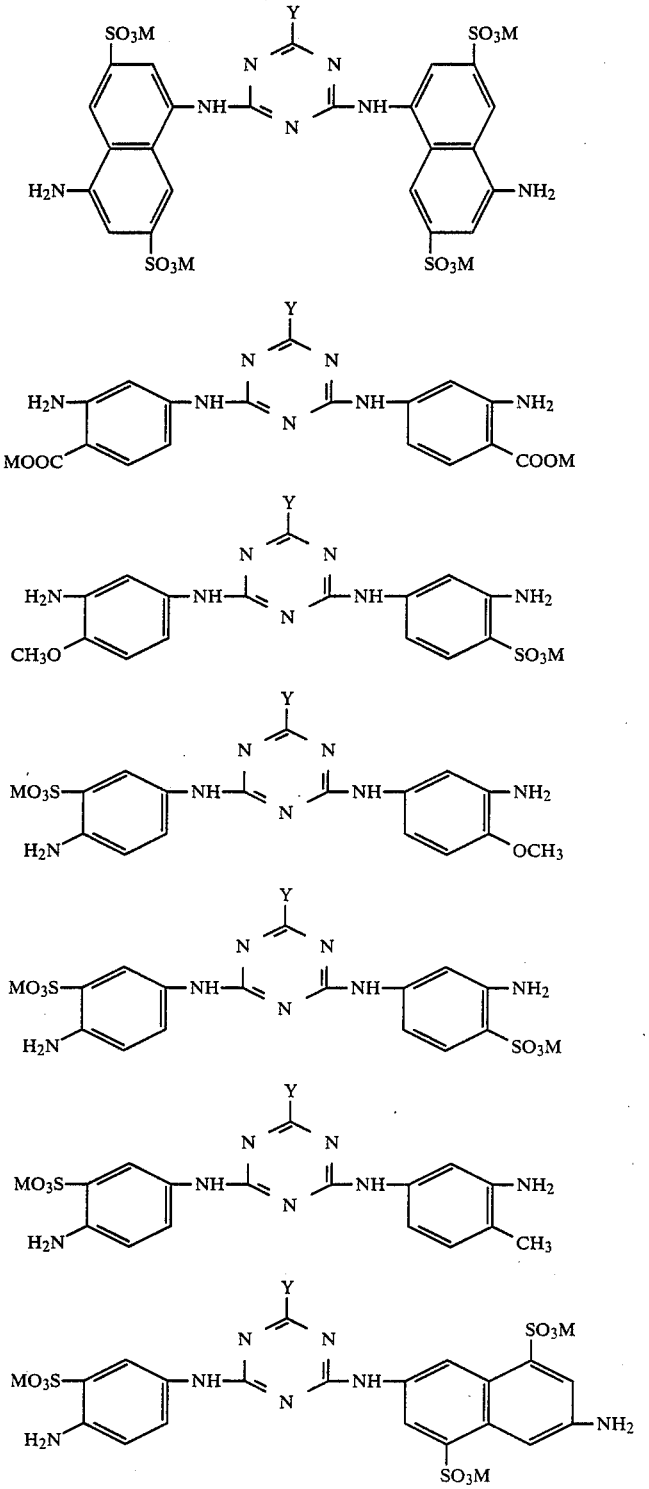

In these formulae, M and Y have the abovementioned meanings, in particular the preferred meanings.

Examples of particularly interesting coupling components of the general formulae (4a) and (4b) which can be used as starting materials in the synthesis of disazo compounds of the invention are 1-(4'-β-sulfatoethylsulfonylphenyl)-3-methylpyrazol-5-one, 1-(4'-β-sulfatoethylsulfonylphenyl)-3-carboxypyrazol-5-one, 1-(4'-β-sulfatoethylsulfonylphenyl)-3-carbomethoxypyrazol-5-one, 1-(4'-β-sulfatoethylsulfonylphenyl)-3-carbethoxypyrazol-5-one, 1-(2'-bromo-4'-β-sulfatoethylsulfonylphenyl)-3-carboxypyrazol-5-one, 1-(2'-chloro-5'-β-sulfatoethylsulfonylphenyl)-3-carbomethoxypyrazol-5-one, 1-(2'-methoxy-4'-β-sulfatoethylsulfonylphenyl)-3-carboxypyrazol-5-one, 1-(2'-methoxy-5'-methyl-4'-β-sulfatoethylsulfonylphenyl)-3-carbomethoxypyrazol-5-one, 1-(2'-methyl-5'-β-sulfatoethylsulfonylphenyl)-3-methylpyrazol-5-one, 1-(2',5'-dimethoxy-4'-β-sulfatoethylsulfonylphenyl)-3-carboxypyrazol-5-one, 1-(3'-β-sulfatoethylsulfonylphenyl)-3-carboxypyrazol-5-one, 1-(4'-methoxy-3'-β-sulfatoethylsulfonylphenyl)-3-carboxypyrazol-5-one, 1-(2'-methoxy-5'-β-sulfatoethylsulfonylphenyl)-3-methylpyrazol-5-one and 1-(4'-β-sulfatoethylsulfonylphenyl)-3-methyl-5-aminopyrazole and those of their derivatives modified in the fiber-reactive group in which the β-sulfatoethylsulfonyl group has been replaced by a vinylsulfonyl, β-chloroethylsulfonyl or β-thiosulfatoethylsulfonyl group.

Of the novel disazo compounds of the formula (1), in particular those disazo compounds are noteworthy which have the general formula (1) in which the two —SO₂—X groups are bonded to the benzene nucleus in a meta- or para-position relative to the nitrogen atom of the pyrazole ring, R¹ and R³ both represent a hydrogen atom or a methoxy group, R² and R⁴ are both a hydrogen atom, R' and R" both represent a hydroxyl group, R+ and R* both denote a methyl group or, preferably, a carboxyl group, D₁ represents a radical of the formula (8a) or (8b), D₂ represents a radical of the formula (8c) or (8d)

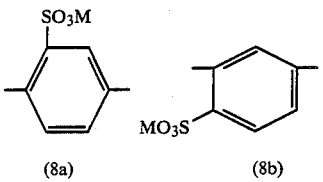

(8a)  (8b)

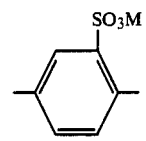

(8c)  (8d)

where M has the abovementioned meaning, and Y, X and M have the abovementioned meanings, in particular the preferred meanings.

Of the disazo compounds of the invention, those which should also be mentioned as par-ticularly preferred which have the general formulae (9), (10), (11), (12), (13) and (14):

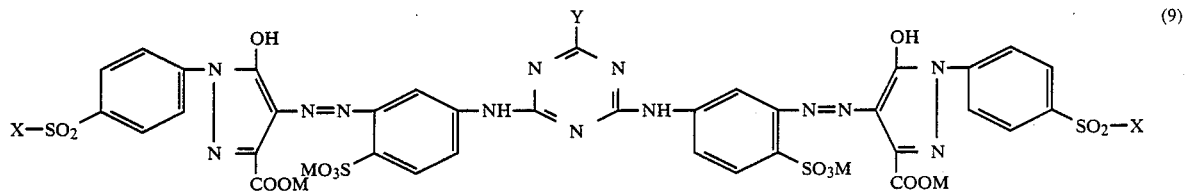

(9)

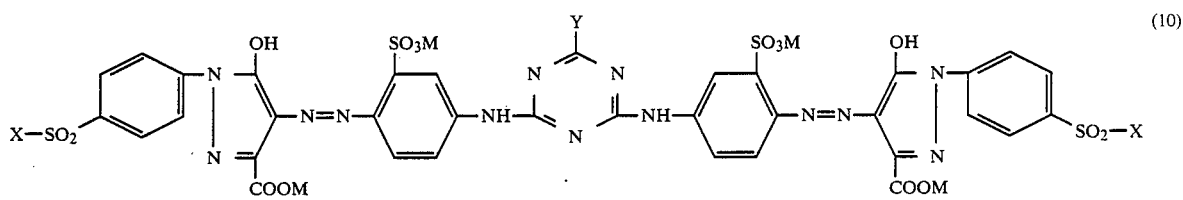

(10)

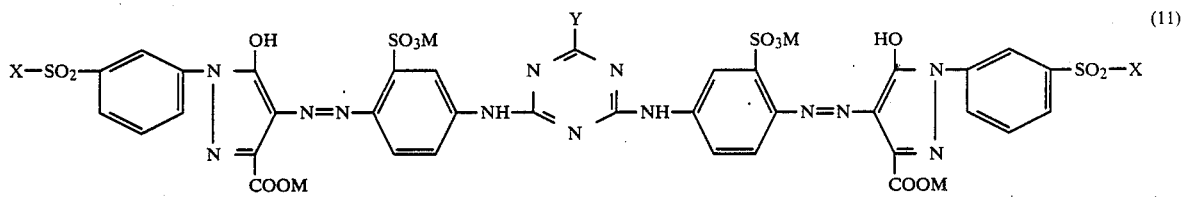

(11)

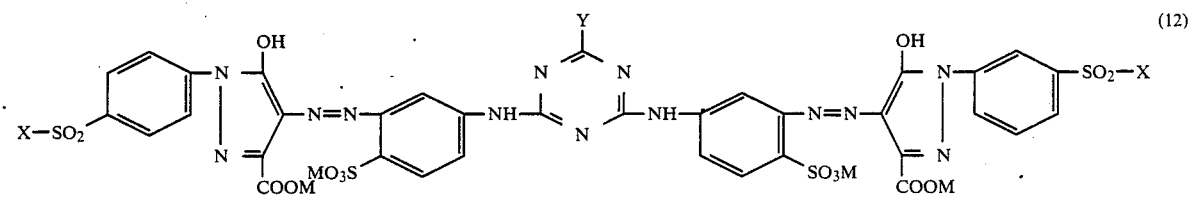

(12)

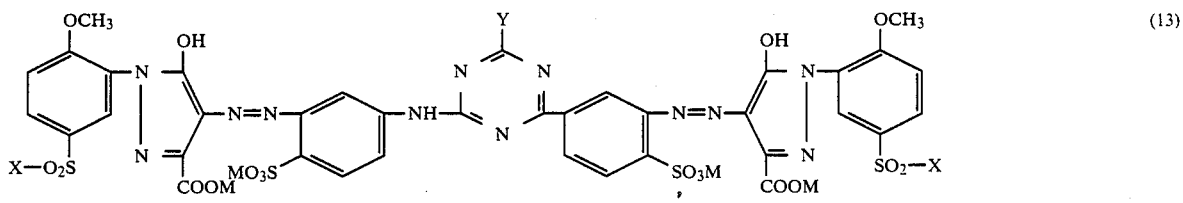

(13)

-continued

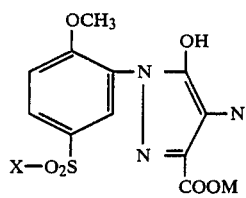 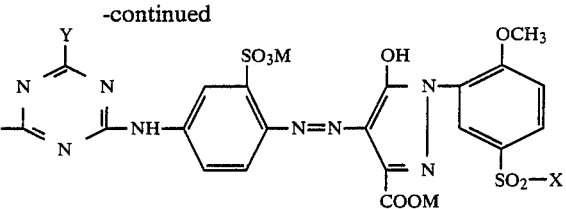

(14)

In these formulae, Y, X and M have the above-mentioned meanings, in particular the preferred meanings.

Compounds of the general formula (1) prepared in accordance with the invention can be separated and isolated from the synthesis solutions by generally known methods, for example by precipitating from the reaction medium by means of electrolytes, such as, for example, sodium chloride or potassium chloride, or by evaporating the reaction solution, for example by spray-drying, it being possible for a buffer substance, such as, for example, a mixture of monosodium phosphate and disodium phosphate to be added to this reaction solution. These synthesis solutions, possibly after addition of a buffer substance and after possible concentrating or diluting, may also be directly used in dyeing as a liquid formulation.

The disazo compounds of the invention have valuable dyestuff properties and fiber-reactive properties. They are preferably used for dyeing (in the general sense, as including printing) hydroxyl- and/or carboxamide-containing materials, for example in the form of sheet-like structures, such as paper or leather, or films, such as, for example, made of polyamide, or in the unshaped state, such as, for example, made of polyamide of polyurethane, but in particular these materials in fiber form. The present invention accordingly also relates to the use of compounds of the general formula (1) for dyeing (in the above sense) these materials or rather to a process for dyeing such materials in conventional procedures in which a compound of the general formula (1) is used as colorant. The materials are preferably used in the form of fiber materials, in particular in the form of textile fibers, such as yarns, packages, or woven or knitted fabrics.

Hydroxyl-containing materials are natural, regenerated or synthetic hydroxyl-containing materials, such as, for example, cellulosic fiber materials or regenerated cellulosic or polyvinyl alcohols. Cellulosic fiber materials are preferably cotton but also other vegetable fibers, such as linen, hemp, jute or ramie fibers; examples of regenerated cellulosic fibers are staple viscose and filament viscose.

Examples of carboxamide-containing materials are synthetic polyamides, such as Nylon 66, Nylon 6, Nylon 11 or Nylon 4, and polyurethanes, in particular in the form of fibers, and natural polyamides, for example wool and other animal hairs, silk or leather.

The disazo compounds of the invention can be applied and fixed to said substrates, in particular to said fiber materials, by the application techniques known for water-soluble dyestuffs, in particular those for fiber-reactive dyestuffs.

For example, by the exhaust method they produce on cellulosic fibers from a long liquor containing various acid-binding agents and, if appropriate, neutral salts, such as sodium chloride or sodium sulfate, dyeings having very high color yields.

The padding method also produces excellent color yields on cellulosic fibers, on which the dyestuffs can be fixed in a customary manner by leaving the dyeing to stand at room temperature or elevated temperatures, for example up to 60° C., by steaming or by means of dry heat.

Strong prints having well-delineated contors and a clear white ground are also obtained in customary printing methods for cellulosic fibers, which can be carried out in one step—for example by printing with a print paste containing sodium bicarbonate or a different acid-binding agent and then steaming at 100°-103° C.—or two steps—for example by printing with a neutral or weakly acid print paste and then fixing either by passing the printed goods through a hot electrolyte-containing alkaline bah or by overpadding with an alkaline electrolyte-containing padding liquor and then leaving the material thus overpadded to stand or steaming it or treating it with dry heat. The outcome of the prints hardly varies with varying fixing conditions, if at all. The degrees of fixation obtained with the compounds of the invention are very high, not only in dyeing but also in printing.

The fastness properties of the dyeings and prints obtained with the disazo compounds of the invention on cellulosic fibers are considerable. This is true not only of the most important manufacturing fastness properties but also of the most important end-use fastness properties. Of these, particular mention should be made of the light fastness properties of dyeings and prints not only in the dry state but also impregnated with water or with acid or alkaline perspiration solution, their wet fastness properties, such as the wash fastness properties, including the peroxide wash fastness, the milling fastness properties, the water fastness, the seawater fastness, the cross-dyeing fastness properties, the perspiration fastness properties, the resistance to chlorine-containing solutions (chlorinated water and chlorine bleach fastness properties), the alkali fastness and the acid fastness properties, and also the fastness to gas fume fading, pleating, ironing and rubbing.

The dyeings on polyamide fibers are customarily carried out from an acid medium. For example, acetic acid o acetic acid and ammonium acetate can be added to the dyebath to obtain the desired pH. To obtain an acceptably level dyeing, it is advisable to add customary leveling agents, for example those based on a reaction product of cyanuric chloride with three times the molar amount of an aminobenzenesulfonic and/or aminonaphthalenesulfonic acid or those based on a reaction product of, for example, stearylamine with ethylene oxide. The dyeings can be carried out not only at the boil but also at a temperature of up to 120° C.

The examples, which follow, serve to illustrate the invention. The compounds described by formula are given in the form of free acids; they are generally prepared and isolated in the form of their sodium or potassium salts, and they are used in the form of their salts for dyeing. Similarly, the starting compounds mentioned in the form of the free acid in the following examples, in particular tabled examples, can be used in the synthesis as such or in the form of their salts, preferably alkali metal salts, such as sodium or potassium salts.

In the examples, parts are parts by weight and percentages are percentages by weight, unless otherwise stated, Parts by weight relate to parts by volume as the kilogram relates to the liter.

EXAMPLE 1

(a) A solution at pH 5.0–5.5 of 188 parts of 1,3-diaminobenzene-4-sulfonic acid in 3,000 parts of water is admixed with efficient stirring at a temperature of 0 to 5° C. with 101.9 parts of cyanuric chloride. The mixture is stirred for one hour at 0° to 5° C. and at a pH value between 4.8 and 5.8 which is maintained by adding sodium bicarbonate a little at a time. The temperature is then raised within one hour to 55° to 60° C., the reaction is continued for 5 hours at this temperature and a pH value between 4.0 and 4.7, and the reaction batch is then cooled down to 18° to 19° C., stirred at this temperature for some hours and then adjusted to a pH value of 5.8 to 6.2 by means of sodium bicarbonate.

(b) 139 parts by volume of a 40% strength sodium nitrite solution are added to the solution of the secondary condensation product of cyanuric chloride and 1,3-diaminobenzene-4-sulfonic acid prepared in this example under (a), and this mixture is allowed to flow with stirring into a mixture of 260 parts by volume of aqueous 31% strength hydrochloric acid, 400 parts of water and 1,600 parts of ice to form a yellow jelly-like tetrazo compound. The batch is stirred at 2° to 6° C. for one hour, and the small excess of nitrous acid is then destroyed, as customary, by means of amidosulfonic acid. The batch is then brought to pH 5.5–6.0 by means of sodium bicarbonate.

(c) In a separate operation, 1-(4'-β-sulfatoethylsulfonylphenyl)-pyrazol-5-one-3-carboxylic acid is prepared as a coupling component:

312 parts of 1-(4'-β-hydroxyethylsulfonylphenyl)-pyrazol-5-one-3-carboxylic acid are added in the course of 5 hours at a temperature of 15° to 20° C. to 598 parts by volume of 95.5% strength aqueous sulfuric acid; this sulfation batch is stirred at 18° to 20° C. for 10 hours. This reaction mixture is then stirred onto a mixture of 3,500 parts of ice and 1,000 parts of water to give a mixture which is brought to pH of 5.2–6.0 by sprinkling in 1,165 parts of calcium carbonate in the course of 4 hours, during which a temperature of less than 10° C. is maintained. The batch is heated to 70° C. by passing in steam, and the precipitated calcium sulfate is then filtered off with suction. The residue is washed with a total of 3,000 parts of water a little at a time; the filtrate and the wash water are combined and cooled down to about 15° C.

(d) The tetrazonium salt solution described under (b) is added to the coupling component solution described in this example under (c); the batch is stirred at about 10° C. for several hours, during which pH 5.5–6.5 is maintained by adding a small amount of sodium bicarbonate, and the batch is then heated to 45° C., is clarified by means of 25 parts of kieselguhr and is filtered.

The disazo compound of the invention is salted out from the filtrate of (d) by adding 2,900 parts of sodium chloride; the suspension is stirred for about 3 hours, and the precipitate is filtered off with suction, dried and milled. This gives a yellow powder which contains electrolyte salts (predominantly sodium chloride) and about 660 to 670 parts of the sodium salt of the compound of the formula

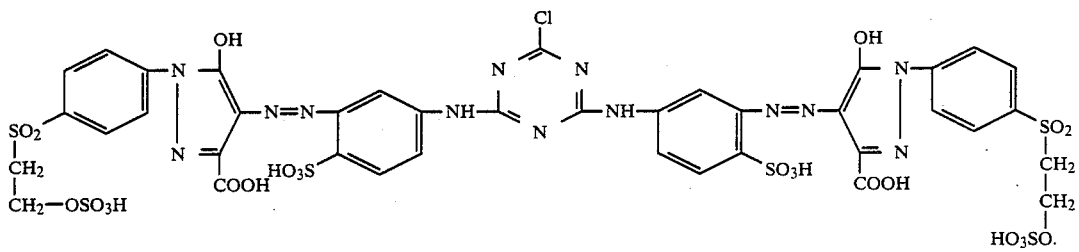

This disazo compound of the invention has very good fiber-reactive dyestuff properties, and dyes cellulosic fiber materials by the application and fixing methods known and customary in industry for fiber-reactive dyestuffs in greenish yellow shades having excellent fastness properties, of which the wash, perspiration, light, rubbing, water and seawater fastness properties are particularly noteworthy. The degrees of fixation obtained on cellulosic materials are very high not only in dyeing but also in printing.

EXAMPLE 2

Example 1 is repeated to prepare disazo compounds of the invention, except that the coupling component used there was replaced by the solution of a mixture of 1-(4'-β-sulfatoethylsulfonylphenyl)-pyrazol-5-one-3-carboxylic acid and 1-(3'-β-sulfatoethylsulfonylphenyl)-pyrazol-5-one-3-carboxylic acid which was obtained in analogy to Example 1 (c) by sulfating a mixture of 198 parts of 1-(4'-β-hydroxyethylsulfonylphenyl)-pyrazol-5-one-3-carboxylic acid and 198 parts of 1-(3'-β-hydroxyethylsulfonylphenyl)-pyrazol-5-one-3-carboxylic acid.

Working up as in Example 1 gives a mixture of three disazo compounds of the invention, namely, in addition to the disazo compound described in Example 1, the two disazo compounds of the formulae

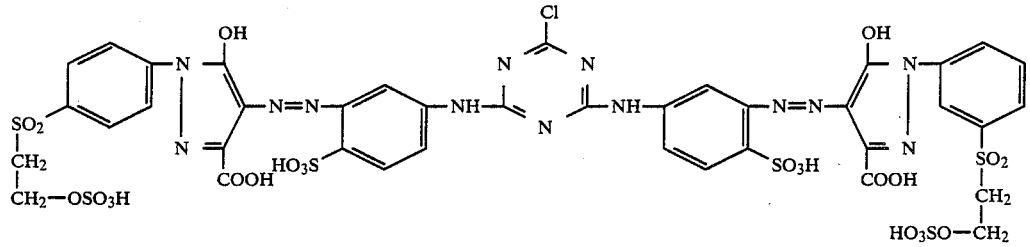

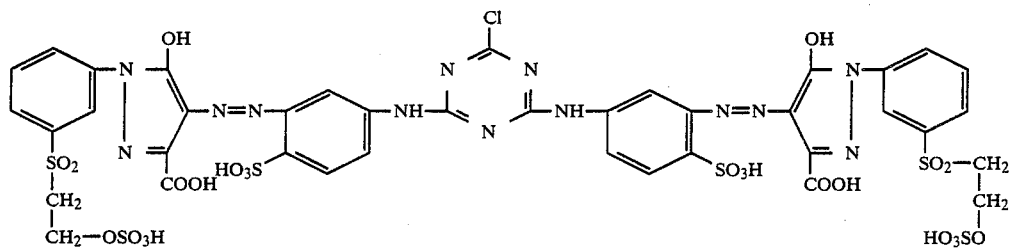

in the form of their sodium salts. This mixture of disazo compounds of the invention has similar coloristic properties as the disazo compound of the invention described in Example 1.

EXAMPLE 3

759 parts of the monoazo compound of the formula

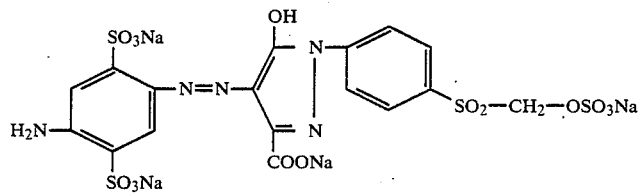

which can be obtained in a customary manner by coupling monodiazotized 1,4-diaminobenzene-2,5-disulfonic acid with 1-(4'-β-sulfatoethylsulfonylphenyl)-pyrazol-5-one-3-carboxylic acid, are dissolved in 4,000 parts of water at pH 5.2–5.7. The solution is cooled down to atemperature of 10° to 13° C. and is admixed with 105 parts of cyanuric chloride; the reaction batch is stirred at 10° to 13° C. and pH 5.2 to 5.7 for some hours and is then heated to 60° to 65° C. and is stirred at this temperature and pH 5.0–5.4 for some hours until thin layer chromatography shows virtually complete conversion.

The synthesis solution is then clarified and spray-dried. This gives a yellow electrolyte-containing powder which contains about 770 to 780 parts of the sodium salt of the compound of the formula example, on cellulosic fiber materials by the printing and dyeing methods customary in industry for fiber-reactive dyestuffs deep reddish yellow prints and dyeings of excellent coloristic fastness properties; these dyeings and prints are particularly distinguished by their wash, perspiration, light, water, seawater and rubbing fastness properties.

EXAMPLE 4

(a) A solution at pH 5.0 to 5.5 of 94 parts of 1,3-diaminobenzene-4-sulfonic acid in 3,000 parts of water is admixed with efficient stirring at a temperature of 0° to 5° C. with 102 parts of cyanuric chloride; the reaction batch is stirred at a temperature of 0° to 10° C. and pH 4.8–5.8 for one hour. 94 pars of 1,4-diaminobenzene-2-sulfonic acid are then added, and the reaction batch is brought to pH 5.0–5.5 by means of sodium bicarbonate, is heated in the course of one hour to 60° C. and is stirred at this temperature and at pH 4.5–5.0 for some hours. The reaction batch is then allowed to cool down to room temperature with stirring, is stirred for a further few hours and is then brought to pH 5.8–6.2 with a little sodium bicarbonate.

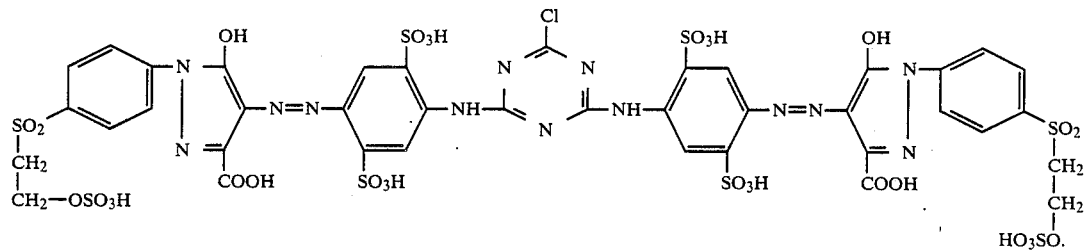

This disazo compound of the invention has very good fiber-reactive dyestuff properties and produces, for (b) To prepare a disazo compound of the invention, the secondary condensation product of cyanuric chloride, 1,3-diaminobenzene-4-sulfonic acid and 1,4-diaminobenzene-2-sulfonic acid prepared in this example under (a) is tetrazotized, the tetrazotized product is coupled in accordance with Example 1(b) et seq. and the novel disazo compound prepared is isolated in a customary manner. This gives a yellow powder which, in addition to electrolyte salts, contains about 650 parts of the sodium salt of the novel disazo compound of the formula nitrous acid is destroyed as customary with a small amount of amidosulfonic acid.

To this diazonium salt solution is added a solution of 1-(4'-β-sulfatoethylsulfonylphenyl)-pyrazol-5-one-3-carboxylic acid, prepared in accordance with Example 1(c) by sulfating 156 parts of the corresponding β-hydroxyethylsulfonyl compound. The coupling reaction is carried out at pH 6.1–6.5.

The disazo compound of the invention is isolated from the synthesis batch in a customary manner. This gives a yellow powder which contains the sodium salt of the compound of the formula

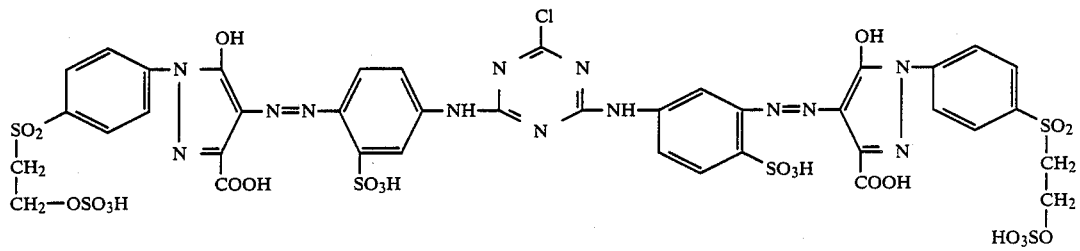

This compound of the invention has very good fiber-

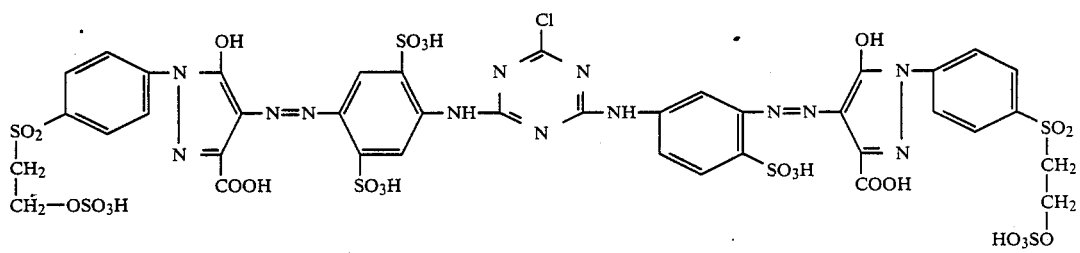

reactive dyestuff properties and produces, for example, on cellulosic fiber materials by the methods customary for reactive dyestuffs reddish yellow dyeings and prints of excellent fastness properties, of which the wash, perspiration, light, water, seawater and rubbing fastness properties are particularly noteworthy.

EXAMPLE 5

379 parts of the monoazo compound described by formula in Example 3 as a starting compound are dissolved in 2,000 parts of water at pH 5.5–5.7. 105 parts of cyanuric chloride are added with stirring at a temperature of 10° to 15° C.; the mixture is stirred at this temperature and pH 5.5–5.7, maintained by means of sodium bicarbonate, until thin layer chromatography indicates virtually complete conversion.

A solution (pH 5.0–5.5 and at 10° to 15° C.) of 94 parts of 1,3-diaminobenzene-4-sulfonic acid in 1,500 parts of water is then added, and the reaction batch is raised to 55° to 60° C. and stirred at this temperature and pH 5.0–5.5 for some hours until thin layer chromatography indicates virtually complete conversion. The reaction batch is then brought to pH 0–1 by means of 31% strength aqueous hydrochloric acid, is cooled down to 0° to 5° C., and is diazotized by adding with stirring a 40% strength aqueous sodium nitrite solution. Excess which has very good fiber-reactive dyestuff properties and produces, for example, on cellulosic fiber materials dyeings and prints of a full yellow which has excellent all-round fastness properties, of which the wash, water, seawater, perspiration, light and rubbing fastness properties are particularly noteworthy.

EXAMPLE 6

The secondary condensation product of 1,3-diaminobenzene-4-sulfonic acid and cyanuric chloride is prepared in accordance with Example 1(a). Added to the solution of this condensation product are 86 parts of aniline-3-sulfonic acid, and the third condensation reaction is continued at pH 6.8–7.8 and at a temperature between 90° and 100° C., with stirring, until conversion is virtually complete.

To prepare a disazo compound of the invention, this tertiary condensation product is tetrazotized in accordance with Example 1(b) and coupled with 1-(4'-β-sulfatoethylsulfonylphenyl)-pyrazol-5-one-3-carboxylic acid in accordance with Example 1(d). The novel disazo compound thus prepared is isolated in a customary manner, for example in accordance with Example 1. This gives the sodium salt of the compound of the formula

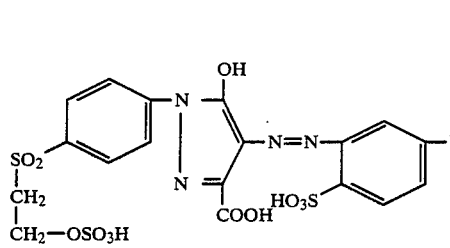 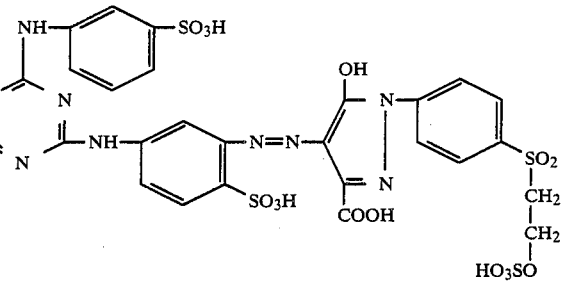

which has very good fiber-reactive dyestuff properties and dyes, for example, cellulosic fiber materials by the application and fixing methods customary in industry for fiber-reactive dyestuffs in greenish yellow shades. These prints and dyeings have very good all-round fastness properties, of which the wash, water, seawater, light, rubbing, perspiration, acid and alkali fastness properties are particularly noteworthy.

EXAMPLES 7 TO 93

The tabled examples, below, describe further disazo compounds of the invention by means of their components and the general formula (1a)

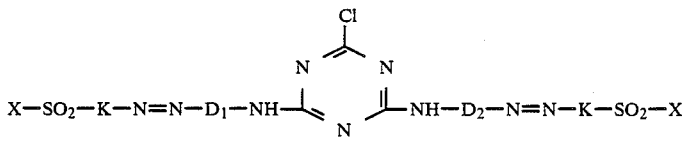

They can be prepared in a manner of the invention, for example in analogy to one of the above illustrative examples or Example 135, below, from their components (cyanuric chloride, the diamino compounds of the formulae $H_2N-D_1-NH_2$ and $H_2N-D_2-NH_2$ and the coupling component of the general formula $-K-SO_2-X$). They have very good fiber-reactive dyestuff properties and produce on the materials mentioned in the descriptive section, such as, in particular, cellulosic fiber materials, by the application methods customary in industrial dyeing and printing, preferably by the application and fixing methods customary in industry for fiber-reactive dyestuffs, strong dyeings and prints having good fastness properties and the shade given in the particular tabled example.

| Example | -D$_1$- | -D$_2$- | —K—SO$_2$-X | Shade |
|---|---|---|---|---|
| 7 | (phenyl with HO$_3$S) | (phenyl with SO$_3$H) | 1-(4'-β-Sulfatoethylsulfonylphenyl)-3-methylpyrazol-5-one | greenish yellow |
| 8 | " | " | 1-(2'-Methyl-5'-β-sulfatoethylsulfonylphenyl)-3-methylpyrazol-5-one | greenish yellow |
| 9 | " | " | 1-(4'-β-Sulfatoethylsulfonylphenyl)-3-carbomethoxypyrazol-5-one | greenish yellow |
| 10 | " | " | 1-(2'-Methoxy-5'-β-sulfatoethylsulfonylphenyl)-3-carboxypyrazol-5-one | greenish yellow |
| 11 | " | " | 1-(2'-Methoxy-5'-β-sulfatoethylsulfonylphenyl)-3-methylpyrazol-5-one | greenish yellow |
| 12 | " | " | 1-(2'-Methyl-5'-β-sulfatoethylsulfonylphenyl)-3-carboxypyrazol-5-one | greenish yellow |
| 13 | " | " | 1-(2'-Bromo-4'-β-sulfatoethylsulfonylphenyl)-3-carboxypyrazol-5-one | greenish yellow |
| 14 | " | " | 1-(2'-Chloro-5'-β-sulfatoethylsulfonylphenyl)-3-carboxypyrazol-5-one | greenish yellow |
| 15 | " | " | 1-(2'-Methoxy-5'-methyl-4'-β-sulfatoethylsulfonylphenyl)-3-carboxypyrazol-5-one | greenish yellow |
| 16 | " | " | 1-(2',5'-Dimethoxy-4'-β-sulfatoethylsulfonylphenyl)-3-carboxypyrazol-5-one | greenish yellow |
| 17 | " | " | 1-(3'-β-Sulfatoethylsulfonylphenyl)-3-carbomethoxypyrazol-5-one | greenish yellow |
| 18 | " | " | 1-(2'-Bromo-4'-β-sulfatoethylsulfonylphenyl)-3-carbomethoxypyrazol-5-one | greenish yellow |
| 19 | " | " | 1-(2'-Chloro-5'-β-sulfatoethylsulfonylphenyl)-3-carbomethoxypyrazol-5-one | greenish yellow |
| 20 | " | " | 1-(2'-Methoxy-5'-methyl-4'-β-sulfatoethylsulfonylphenyl)-3-carbomethoxypyrazol-5-one | greenish yellow |
| 21 | " | " | 1-(2',5'-Dimethoxy-4'-β-sulfatoethylsulfonylphenyl)-3-carbomethoxypyrazol-5-one | greenish yellow |
| 22 | " | " | 1-(4'-β-Sulfatoethylsulfonylphenyl)-3- | greenish |

-continued

| Example | -D$_1$- | -D$_2$- | —K—SO$_2$-X | Shade |
|---|---|---|---|---|
| | | | carbethoxypyrazol-5-one | yellow |
| 23 | " | " | 1-(2'-Methoxy-4'-β-sulfatoethylsulfonyl-phenyl)-3-methylpyrazol-5-one | greenish yellow |
| 24 | ![phenyl with SO$_3$H] | ![phenyl with SO$_3$H] | 1-(4'-β-Sulfatoethylsulfonylphenyl)-3-carbomethoxypyrazol-5-one | reddish yellow |
| 25 | " | " | 1-(3'-β-Sulfatoethylsulfonylphenyl)-3-carboxypyrazol-5-one | reddish yellow |
| 26 | " | " | 1-(2'-Methyl-5'-β-sulfatoethylsulfonyl-phenyl)-3-carboxypyrazol-5-one | reddish yellow |
| 27 | " | " | 1-(2'-Bromo-4'-β-sulfatoethylsulfonyl-phenyl)-3-carboxypyrazol-5-one | reddish yellow |
| 28 | " | " | 1-(2'-Chloro-5'-β-sulfatoethylsulfonyl-phenyl)-3-carboxypyrazol-5-one | reddish yellow |
| 29 | " | " | 1-(2'-Methoxy-5'-β-sulfatoethylsulfonyl-phenyl)-3-carboxypyrazol-5-one | reddish yellow |
| 30 | " | " | 1-(2'-Methoxy-4'-β-sulfatoethylsulfonyl-phenyl)-3-carboxypyrazol-5-one | reddish yellow |
| 31 | " | " | 1-(2'-Methoxy-5'-methyl-4'-β-sulfatoethyl-sulfonylphenyl)-3-carboxypyrazol-5-one | reddish yellow |
| 32 | " | " | 1-(2',5'-Dimethoxy-4'-β-sulfatoethyl-sulfonylphenyl)-3-carboxypyrazol-5-one | reddish yellow |
| 33 | " | " | 1-(3'-β-Sulfatoethylsulfonylphenyl)-3-carbomethoxypyrazol-5-one | reddish yellow |
| 34 | " | " | 1-(2'-Bromo-4'-β-sulfatoethylsulfonyl-phenyl)-3-carbomethoxypyrazol-5-one | reddish yellow |
| 35 | " | " | 1-(2'-Chloro-5'-β-sulfatoethylsulfonyl-phenyl)-3-carbomethoxypyrazol-5-one | reddish yellow |
| 36 | " | " | 1-(2'-Methyl-5'-β-sulfatoethylsulfonyl-phenyl)-3-carbomethoxypyrazol-5-one | reddish yellow |
| 37 | " | " | 1-(2'-Methoxy-5'-β-sulfatoethylsulfonyl-phenyl)-3-carbomethoxypyrazol-5-one | reddish yellow |
| 38 | " | " | 1-(2'-Methoxy-4'-β-sulfatoethylsulfonyl-phenyl)-3-carbomethoxypyrazol-5-one | reddish yellow |
| 39 | " | " | 1-(2'-Methoxy-5'-methyl-4'-β-sulfatoethyl-sulfonylphenyl)-3-carbomethoxypyrazol-5-one | reddish yellow |
| 40 | " | " | 1-(4'-β-Sulfatoethylsulfonylphenyl)-3-carbethoxypyrazol-5-one | reddish yellow |
| 41 | " | " | 1-(4'-β-Sulfatoethylsulfonylphenyl)-3-methylpyrazol-5-one | reddish yellow |
| 42 | " | " | 1-(2'-Methyl-5'-β-sulfatoethylsulfonyl-phenyl)-3-methylpyrazol-5-one | reddish yellow |
| 43 | " | " | 1-(2'-Methoxy-4'-β-sulfatoethylsulfonyl-phenyl)-3-methylpyrazol-5-one | reddish yellow |
| 44 | — | — | 1-(2'-Methoxy-5'-β-sulfatoethylsulfonyl-phenyl)-3-methylpyrazol-5-one | reddish yellow |
| 45 | ![phenyl with two SO$_3$H at 1,4] | ![phenyl with two SO$_3$H at 1,4] | 1-(4'-β-Sulfatoethylsulfonylphenyl)-3-carbomethoxypyrazol-5-one | yellow |
| 46 | " | " | 1-(4'-β-Sulfatoethylsulfonylphenyl)-3-methylpyrazol-5-one | yellow |
| 47 | " | " | 1-(4'-β-Chloroethylsulfonylphenyl)-3-methylpyrazol-5-one | yellow |
| 48 | " | " | 1-(4'-Vinylsulfonylphenyl)-3-carboxypyrazol-5-one | yellow |
| 49 | ![phenyl with two SO$_3$H] | ![phenyl with two SO$_3$H] | 1-(4'-β-Sulfatoethylsulfonylphenyl)-3-methylpyrazol-5-one | yellow |
| 50 | " | " | 1-(2'-Methoxy-4'-β-sulfatoethylsulfonyl-phenyl)-3-methylpyrazol-5-one | yellow |
| 51 | " | " | 1-(2'-Methoxy-5'-β-sulfatoethylsulfonyl-phenyl)-3-methylpyrazol-5-one | yellow |

-continued

| Example | -D₁- | -D₂- | —K—SO₂-X | Shade |
|---------|------|------|----------|-------|
| 52 | " | " | 1-(2'-Methoxy-4'-β-sulfatoethylsulfonyl-phenyl)-3-methylpyrazol-5-one | yellow |
| 53 | " | " | 1-(4'-β-Sulfatoethylsulfonylphenyl)-3-carbomethoxypyrazol-5-one | yellow |
| 54 | " | " | 1-(3'-β-Sulfatoethylsulfonylphenyl)-3-carbomethoxypyrazol-5-one | yellow |
| 55 | " | " | 1-(2'-Methyl-5'-β-sulfatoethylsulfonylphenyl)-3-carbomethoxypyrazol-5-one | yellow |
| 56 | " | " | 1-(2'-Methoxy-5'-β-sulfatoethylsulfonylphenyl)-3-carbomethoxypyrazol-5-one | yellow |
| 57 | " | " | 1-(2'-Methoxy-5'-methyl-4'-β-sulfatoethyl-sulfonylphenyl)-3-carbomethoxypyrazol-5-one | yellow |
| 58 | " | " | 1-(2',5'-Dimethoxy-4'-β-sulfatoethylsulfonyl-phenyl)-3-carbomethoxypyrazol-5-one | yellow |
| 59 | " | " | 1-(2'-Bromo-4'-β-sulfatoethylsulfonylphenyl)-3-carbomethoxypyrazol-5-one | yellow |
| 60 | " | " | 1-(2'-Chloro-5'-β-sulfatoethylsulfonyl-phenyl)-3-carbomethoxypyrazol-5-one | yellow |
| 61 | " | " | 1-(4'-Vinylsulfonylphenyl)-3-methyl-pyrazol-5-one | yellow |
| 62 | " | " | 1-(4'-Vinylsulfonylphenyl)-3-carbomethoxy-pyrazol-5-one | yellow |
| 63 | " | " | 1-(4'-β-Chloroethylsulfonylphenyl)-3-carb-ethoxypyrazol-5-one | yellow |
| 64 | 4-methyl-benzene-1-SO₃H (CH₃, SO₃H on ring) | 4-methyl-benzene-1-SO₃H (CH₃, SO₃H on ring) | 1-(4'-β-Sulfatoethylsulfonylphenyl)-3-carboxypyrazol-5-one | yellow |
| 65 | " | " | 1-(3'-β-Sulfatoethylsulfonylphenyl)-3-carboxypyrazol-5-one | yellow |
| 66 | " | " | 1-(2'-Methoxy-5'-β-sulfatoethylsulfonyl-phenyl)-3-carboxypyrazol-5-one | yellow |
| 67 | naphthalene-1,5-di-SO₃H | naphthalene-1,5-di-SO₃H | 1-(4'-β-Sulfatoethylsulfonylphenyl)-3-carboxypyrazol-5-one | yellow |
| 68 | " | " | 1-(4'-β-Sulfatoethylsulfonylphenyl)-3-methylpyrazol-5-one | yellow |
| 69 | " | " | 1-(4'-β-Sulfatoethylsulfonylphenyl)-3-carbomethoxypyrazol-5-one | yellow |
| 70 | naphthalene-2,6-di-SO₃H | naphthalene-2,6-di-SO₃H | 1-(4'-β-Sulfatoethylsulfonylphenyl)-3-carboxypyrazol-5-one | yellow |
| 71 | " | " | 1-(4'-β-Sulfatoethylsulfonylphenyl)-3-methyl-pyrazol-5-one | yellow |
| 72 | benzene-SO₃H | naphthalene-1,5-di-SO₃H | 1-(4'-β-Sulfatoethylsulfonylphenyl)-3-carboxypyrazol-5-one | yellow |

-continued

| Example | -D1- | -D2- | —K—SO2—X | Shade |
|---|---|---|---|---|
| 73 | " | phenyl-SO3H | 1-(4'-β-Sulfatoethylsulfonylphenyl)-3-carbomethoxypyrazol-5-one | yellow |
| 74 | " | " | 1-(4'-β-Sulfatoethylsulfonylphenyl)-3-methylpyrazol-5-one | yellow |
| 75 | " | " | 1-(2'-Methoxy-4'-β-sulfatoethylsulfonylphenyl)-3-methylpyrazol-5-one | yellow |
| 76 | " | " | 1-(2'-Methoxy-5'-β-sulfatoethylsulfonylphenyl)-3-methylpyrazol-5-one | yellow |
| 77 | " | " | 1-(2'-Methyl-5'-β-sulfatoethylsulfonylphenyl)-3-methylpyrazol-5-one | yellow |
| 78 | " | " | 1-(3'-β-Sulfatoethylsulfonylphenyl)-3-carboxypyrazol-5-one | yellow |
| 79 | " | " | 1-(2'-Methoxy-5'-methyl-4'-β-sulfatoethylsulfonylphenyl)-3-carbomethoxypyrazol-5-one | yellow |
| 80 | " | " | 1-(2'-Bromo-4'-β-sulfatoethylsulfonylphenyl)-3-carbomethoxypyrazol-5-one | yellow |
| 81 | " | " | 1-(4'-Thiosulfatoethylsulfonylphenyl)-3-carbomethoxypyrazol-5-one | yellow |
| 82 | HO3S-phenyl | phenyl | 1-(4'-β-Sulfatoethylsulfonylphenyl)-3-carboxypyrazol-5-one | yellow |
| 83 | " | " | 1-(4'-β-Sulfatoethylsulfonylphenyl)-3-carbomethoxypyrazol-5-one | yellow |
| 84 | " | " | 1-(4'-β-Sulfatoethylsulfonylphenyl)-3-methylpyrazol-5-one | yellow |
| 85 | " | Cl-phenyl | 1-(4'-β-Sulfatoethylsulfonylphenyl)-3-carboxypyrazol-5-one | yellow |
| 86 | " | " | 1-(4'-β-Sulfatoethylsulfonylphenyl)-3-methylpyrazol-5-one | yellow |
| 87 | " | " | 1-(3'-β-Thiosulfatoethylsulfonylphenyl)-3-carbomethoxypyrazol-5-one | yellow |
| 88 | " | CH3-phenyl | 1-(4'-β-Sulfatoethylsulfonylphenyl)-3-carboxypyrazol-5-one | yellow |
| 89 | " | " | 1-(2'-Methoxy-5'-β-thiosulfatoethylsulfonylphenyl)-3-carbomethoxypyrazol-5-one | yellow |
| 90 | " | " | 1-(4'-β-Sulfatoethylsulfonylphenyl)-3-methylpyrazol-5-one | yellow |
| 91 | " | OCH3-phenyl | 1-(4'-β-Sulfatoethylsulfonylphenyl)-3-carboxypyrazol-5-one | yellow |
| 92 | " | " | 1-(4'-β-Sulfatoethylsulfonylphenyl)-3-carboxypyrazol-5-one | yellow |
| 93 | " | " | 1-(4'-β-Sulfatoethylsulfonylphenyl)-3-methylpyrazol-5-one | yellow |

EXAMPLES 94 TO 119

The following tabled examples describe further disazo compounds of the invention by means of their components and the general formula (1b)

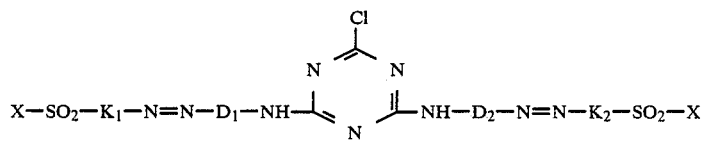

(1b)

They can be prepared in a manner of the invention, for example in analogy to one of the above illustrative examples or Example 135, below, from their components (cyanuric chloride, the diamino compounds of the formulae $H_2N$—$D_1$—$NH_2$ and $H_2N$—$D_2$—$NH_2$ and the coupling component of the general formula —K—$SO_2$—X). They have very good fiber-reactive dyestuff properties and produce on the materials mentioned in the descriptive section, such as, in particular, cellulosic fiber materials, by the application methods customary in industrial dyeing and printing, preferably by the application and fixing methods customary in industry for fiber-reactive dyestuffs, strong dyeings and prints having good fastness properties and the shade given in the particular tabled example.

| Example | -$D_1$- | -$D_2$- | —$K_1$—$SO_2$-X | —$K_2$—$SO_2$-X | Shade |
|---|---|---|---|---|---|
| 94 | ![benzene with MO3S] | ![benzene with SO3M] | 1-(4'-β-Sulfatoethylsulfonylphenyl)-3-carboxypyrazol-5-one | 1-(2',5'-Dimethoxy-4'-β-sulfatoethylsulfonylphenyl)-3-carboxypyrazol-5-one | greenish yellow |
| 95 | " | " | 1-(4'-β-Sulfatoethylsulfonylphenyl)-3-carboxypyrazol-5-one | 1-(4'-β-Sulfatoethylsulfonylphenyl)-3-methylpyrazol-5-one | greenish yellow |
| 96 | " | " | 1-(4'-β-Sulfatoethylsulfonylphenyl)-3-carboxypyrazol-5-one | 1-(2'-Methoxy-4'-β-sulfatoethylsulfonylphenyl)-3-methylpyrazol-5-one | greenish yellow |
| 97 | " | " | 1-(4'-β-Sulfatoethylsulfonylphenyl)-3-carboxypyrazol-5-one | 1-(2'-Methyl-5'-β-sulfatoethylsulfonylphenyl)-3-methylpyrazol-5-one | greenish yellow |
| 98 | " | " | 1-(4'-β-Sulfatoethylsulfonylphenyl)-3-carboxypyrazol-5-one | 1-(4'-β-Thiosulfatoethylsulfonylphenyl)-3-carbomethoxypyrazol-5-one | greenish yellow |
| 99 | " | " | 1-(4'-β-Sulfatoethylsulfonylphenyl)-3-carboxypyrazol-5-one | 1-(4'-β-Chloroethylsulfonylphenyl)-3-carbomethoxypyrazol-5-one | greenish yellow |
| 100 | " | " | 1-(4'-β-Sulfatoethylsulfonylphenyl)-3-carboxypyrazol-5-one | 1-(4'-Vinylsulfonylphenyl)-3-carbomethoxypyrazol-5-one | greenish yellow |
| 101 | ![benzene with SO3H] | ![benzene with SO3H] | 1-(4'-β-Sulfatoethylsulfonylphenyl)-3-carboxypyrazol-5-one | 1-(3'-β-Sulfatoethylsulfonylphenyl)-3-carboxypyrazol-5-one | reddish yellow |
| 102 | ![benzene with SO3H] | ![benzene with SO3H] | 1-(4'-β-Sulfatoethylsulfonylphenyl)-3-carboxypyrazol-5-one | 1-(2'-Methoxy-5'-β-sulfatoethylsulfonylphenyl)-3-carboxypyrazol-5-one | reddish yellow |
| 103 | " | " | 1-(4'-β-Sulfatoethylsulfonylphenyl)-3-carboxypyrazol-5-one | 1-(4'-β-Sulfatoethylsulfonylphenyl)-3-methylpyrazol-5-one | reddish yellow |
| 104 | " | " | 1-(4'-β-Sulfatoethylsulfonylphenyl)-3-carboxypyrazol-5-one | 1-(2'-Methyl-5'-β-sulfatoethylsulfonyl)-3-methylpyrazol-5-one | reddish yellow |
| 105 | " | " | 1-(4'-β-Sulfatoethylsulfonylphenyl)-3-carboxypyrazol-5-one | 1-(3'-β-Sulfatoethylsulfonylphenyl)-3-carbomethoxypyrazol-5-one | reddish yellow |
| 106 | " | " | 1-(4'-β-Sulfatoethylsulfonylphenyl)-3-carbomethoxypyrazol-5-one | 1-(3'-β-Sulfatoethylsulfonylphenyl)-3-carbomethoxypyrazol-5-one | reddish yellow |
| 107 | " | " | 1-(4'-β-Sulfatoethylsulfonylphenyl)-3-carbomethoxypyrazol-5-one | 1-(2'-Methoxy-5'-β-sulfatoethylsulfonylphenyl)-3-carbomethoxypyrazol-5-one | reddish yellow |
| 108 | " | " | 1-(4'-β-Sulfatoethylsulfonylphenyl)-3-carbomethoxypyrazol-5-one | 1-(2'-Methoxy-5'-methyl-4'-β-sulfatoethylsulfonylphenyl)-3-carbomethoxypyrazol-5-one | reddish yellow |
| 109 | " | " | 1-(4'-β-Sulfatoethylsulfonylphenyl)-3-carbomethoxypyrazol-5-one | 1-(4'-β-sulfatoethylsulfonylphenyl)-3-methylpyrazol-5-one | reddish yellow |

-continued

| Example | -D₁- | -D₂- | —K₁—SO₂-X | —K₂—SO₂-X | Shade |
|---|---|---|---|---|---|
| 110 | phenyl with SO₃H (para) | phenyl with SO₃H (ortho) | 1-(4'-β-Sulfatoethyl-sulfonylphenyl)-3-methylpyrazol-5-one | 1-(2'-Methyl-5'-β-sulfato-ethylsulfonylphenyl)-3-methylpyrazol-5-one | reddish yellow |
| 111 | " | " | 1-(4'-β-Sulfatoethyl-sulfonylphenyl)-3-methylpyrazol-5-one | 1-(2'-Methoxy-5'-β-sulfato-ethylsulfonylphenyl)-3-methylpyrazol-5-one | reddish yellow |
| 112 | " | " | 1-(4'-β-Sulfatoethyl-sulfonylphenyl)-3-methylpyrazol-5-one | 1-(3'-β-Sulfatoethyl-sulfonylphenyl)-3-carbo-methylpyrazol-5-one | reddish yellow |
| 113 | phenyl with HO₃S (meta) | phenyl with SO₃H | 1-(4'-β-Sulfatoethyl-sulfonylphenyl)-3-carboxypyrazol-5-one | 1-(2'-Methoxy-5'-β-sulfato-ethylsulfonylphenyl)-3-carboxypyrazol-5-one | greenish yellow |
| 114 | " | " | 1-(4'-β-Sulfatoethyl-sulfonylphenyl)-3-carboxypyrazol-5-one | 1-(2'-Methoxy-5'-methyl-4'-β-sulfatoethylsulfonyl-phenyl)-3-carboxypyrazol-5-one | greenish yellow |
| 115 | " | phenyl with SO₃H | 1-(4'-β-Sulfatoethyl-sulfonylphenyl)-3-carboxypyrazol-5-one | 1-(4'-β-Sulfatoethyl-sulfonylphenyl)-3-methyl-pyrazol-5-one | yellow |
| 116 | " | " | 1-(4'-β-Thiosulfato-ethylsulfonylphenyl)-3-carbomethoxypyrazol-5-one | 1-(4'-β-Sulfatoethyl-sulfonylphenyl)-3-methyl-pyrazol-5-one | yellow |
| 117 | phenyl with HO₃S | phenyl with SO₃H | 1-(4'-β-Sulfatoethyl-sulfonylphenyl)-3-carbo-methoxypyrazol-5-one | 1-(2'-Methoxy-5'-β-sulfato-ethylsulfonylphenyl)-3-methylpyrazol-5-one | yellow |
| 118 | phenyl with SO₃H and SO₃H | " | 1-(4'-β-Sulfatoethyl-sulfonylphenyl)-3-methyl-pyrazol-5-one | 1-(2'-Methyl-5'-β-sulfato-ethylsulfonylphenyl)-3-methylpyrazol-5-one | reddish yellow |
| 119 | " | " | 1-(4'-β-Sulfatoethyl-sulfonylphenyl)-3-carbomethoxypyrazol-5-one | 1-(3'-β-Sulfatoethyl-sulfonylphenyl)-3-carbo-methoxypyrazol-5-one | reddish yellow |

EXAMPLES 120 TO 126

The following tabled examples describe further disazo compounds f the invention by means of their components and the general formula (1c)

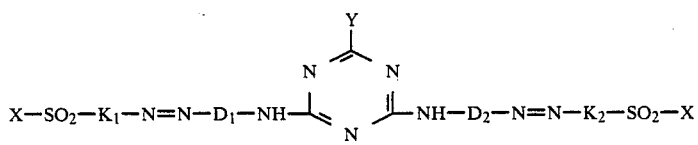

(1c)

They can be prepared in a manner of the invention, for example in analogy to one of the above illustrative examples or Example 135, below, from their components (cyanuric chloride, the diamino compounds of the formulae H₂N—D₁—NH₂ and H₂N—D₂—NH₂ and the coupling component of the general formula —K—SO₂—X). They have very good fiber-reactive dyestuff properties and produce on the materials mentioned in the descriptive section, such as, in particular, cellulosic fiber materials, by the application methods customary in industrial dyeing and printing, preferably by the application and fixing methods customary in industry for fiber-reactive dyestuffs, strong dyeings and prints having good fastness properties and the shade given in the particular tabled example.

This disazo compound of the invention has very good fiber-reactive dyestuff properties and dyes the materials mentioned in the descriptive section, such as, in particu-

| Example | -D$_1$- | -D$_2$- | —K$_1$—SO$_2$-X | —K$_2$—SO$_2$-X | Y | Shade |
|---|---|---|---|---|---|---|
| 120 | 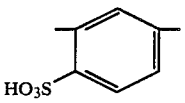 | 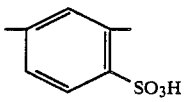 | 1-(4'-β-Sulfatoethyl-sulfonylphenyl)-3-carboxypyrazol-5-one | 1-(4'-β-Sulfatoethyl-sulfonylphenyl)-3-carboxypyrazol-5-one | Bromine | greenish yellow |
| 121 | " | " | 1-(4'-β-Sulfatoethyl-sulfonylphenyl)-3-carboxypyrazol-5-one | 1-(4'-β-Sulfatoethyl-sulfonylphenyl)-3-carboxypyrazol-5-one | Fluorine | greenish yellow |
| 122 | " | " | 1-(4'-β-Sulfatoethyl-sulfonylphenyl)-3-carboxypyrazol-5-one | 1-(4'-β-Sulfatoethyl-sulfonylphenyl)-3-carboxypyrazol-5-one | N-Methyl-phenyl-amino | greenish yellow |
| 123 | " | " | 1-(4'-β-Sulfatoethyl-sulfonylphenyl)-3-carboxypyrazol-5-one | 1-(4'-β-Sulfatoethyl-sulfonylphenyl)-3-carboxypyrazol-5-one | p-Sulfo-phenoxy | greenish yellow |
| 124 | 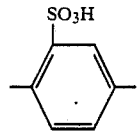 | 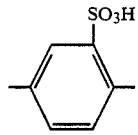 | 1-(4'-β-Sulfatoethyl-sulfonylphenyl)-3-carboxypyrazol-5-one | 1-(4'-β-Sulfatoethyl-sulfonylphenyl)-3-carboxypyrazol-5-one | Fluorine | reddish yellow |
| 125 | " | 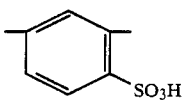 | 1-(4'-β-Sulfatoethyl-sulfonylphenyl)-3-carboxypyrazol-5-one | 1-(4'-β-Thiosulfato-ethylsulfonylphenyl)-3-carbomethoxy-pyrazol-5-one | N-Ethyl-phenyl-amino | yellow |
| 126 | " | " | 1-(4'-β-Sulfatoethyl-sulfonylphenyl)-3-carboxypyrazol-5-one | 1-(4'-β-Sulfatoethyl-sulfonylphenyl)-3-carbomethoxy-pyrazol-5-one | m-Sulfo-phenyl amino | yellow |

EXAMPLE 127

The secondary condensation product of 188 parts of 1,3-diaminobenzene-4-sulfonic acid and 101.9 parts of cyanuric chloride is prepared as in Example 1(a) and tetrazotized as described in Example 1(b). This tetrazonium salt is then coupled in an aqueous solution at pH 6.0–6.7 and 18°–20° C. with 362 parts of 1-(4'-β-sulfatoethylsulfonylphenyl)-3-methyl-5-aminopyrazole by stirring for several hours.

The novel disazo compound prepared is salted out from the synthesis solution by adding potassium chloride, filtered off with solution, dried and milled. This gives a yellow powder which contains electrolyte salts (predominantly potassium chloride) and an alkali metal salt, predominantly the potassium salt, of the disazo compound of the formula lar, cellulosic fiber materials, by the application and fixing methods customary in industry for fiber-reactive dyestuffs in yellow shades of excellent fastness properties, of which the excellent wash fastness, perspiration, light, rubbing, water and seawater fastness properties and the very good stability to chlorinated tap-water are particularly noteworthy.

The aminopyrazole compound used as coupling component is known from German Patent No. 2,161,698.

EXAMPLE 128

To prepare a disazo compound of the invention, Example 127 is repeated, except that the coupling component used is 392 parts of 1-(2'-methoxy-5'-β-sulfatoethylsulfonylphenyl)-3-methyl-5-aminopyrazole. Customary working up, for example in accordance with Example 127, gives an alkali metal salt, such as the potassium salt, of the compound of the formula

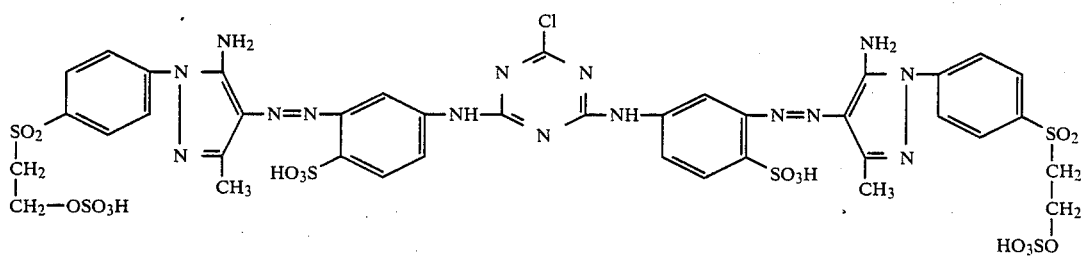

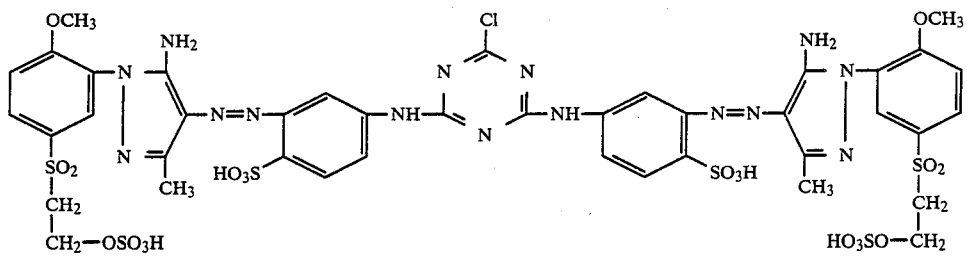

which has very good fiber-reactive dyestuff properties and coloristic properties which are similar to those of the novel disazo compound of Example 127.

The aminopyrazole compound used in this example is known from German Offenlegungsschrift No. 2,161,761.

EXAMPLES 129 TO 134

The following tabled examples describe further disazo compounds of the invention by means of their components and the earlier general formula (1a)

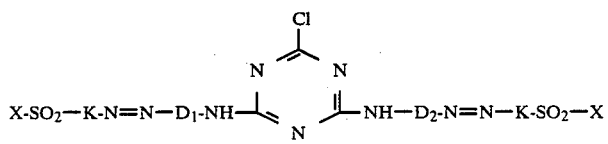 (1a)

They can be prepared in a manner of the invention, for example in analogy to one of the above illustrative examples or Example 135, below, from their components (cyanuric chloride, the diamino compounds of the formulae $H_2N-D_1-NH_2$ and $H_2N-D_2-NH_2$ and the coupling component of the general formula $-K-SO_2-X$). They have very good fiber-reactive dyestuff properties and produce on the materials mentioned in the descriptive section, such as, in particular, cellulosic fiber materials, by the application methods customary in industrial dyeing and printing, preferably by the application and fixing methods customary in industry for fiber-reactive dyestuffs, strong dyeings and prints having good fastness properties and the shade given in the particular tabled example.

| Example | -D$_1$- | -D$_2$- | —K—SO$_2$-X | Shade |
|---|---|---|---|---|
| 129 | ![SO$_3$H phenyl] | ![SO$_3$H phenyl] | 1-(4'-βSulfatoethylsulfonylphenyl)-3-methyl-5-aminopyrazole | yellow |
| 130 | " | " | 1-(2'-Methoxy-5'-β-sulfatoethylsulfonylphenyl)-3-methyl-5-aminopyrazole | yellow |
| 131 | " | " | 1-(2',5'-Dimethoxy-4'-β-sulfatoethylsulfonylphenyl)-3-methyl-5-aminopyrazole | yellow |
| 132 | " | " | 1-(2'-Methoxy-5'-methyl-4'-β-sulfatoethylsulfonylphenyl)-3-methyl-5-aminopyrazole | yellow |
| 133 | ![HO$_3$S phenyl] | ![SO$_3$H phenyl] | 1-(2'-Methoxy-5'-β-sulfatoethylsulfonyl phenyl)-3-methyl-5-aminopyrazole | yellow |
| 134 | " | " | 1-(2'-Methoxy-5'-methyl-4'-β-sulfatoethylsulfonylphenyl)-3-methyl-5-aminopyrazole | yellow |

EXAMPLE 135

(a) A solution at pH 7.2–7.6 of 188 parts of 1,4-diaminobenzene-2-sulfonic acid in 200 parts of water is admixed with 1,00 parts of crushed ice and 500 parts by volume of acetone. 100 parts of cyanuric chloride are added a little at a time with efficient stirring at a temperature of —5° C. to 0° C. in the course of 50 minutes, during which pH 5.5–6.3 is maintained by slowly adding 260 parts by volume of a 19% strength aqueous sodium carbonate solution. The batch is stirred for 3 hours, then heated to 25° C. and clarified, the filtrate is cooled down to 10° C., 139 parts by volume of a 40% strength aqueous sodium nitrite solution are added, and this mixture is allowed to flow with stirring into a mixture of 500 parts by volume of 31% strength aqueous hydrochloric acid and 2,250 parts of ice. The mixture is stirred at a temperature of 2° to 6° C. for one hour, and excess nitrous acid is destroyed in a customary manner by means of amidosulfonic acid.

(b) A solution of a coupling component is prepared in a separate operation: 312 parts of 1-(4'-β-hydroxyethylsulfonylphenyl)-pyrazol-5-one-3-carboxylic acid are added at 15° to 20° C. in the course of 5 hours to 598 parts by volume of 95.5% strength aqueous sulfuric acid, and the mixture is stirred at 18° to 20° C. for 10 hours. This reaction mixture is then added with stirring to a mixture of 3,500 parts of ice and 1,000 parts of water, the resulting mixture being brought to pH of 5.2-6.0 by sprinkling in about 1,160 parts of calcium carbonate in the course of 4 hours, during which a temperature of less than 10° C. is maintained. The batch is then heated to 70° C. by passing in steam, the precipitated calcium sulfate is filtered off with suction, and washed with a total of 3,000 parts of water a little at a time, and the filtrate and wash water are combined and cooled down to about 25° C.

(c) The tetrazonium salt solution described under (a) is added to this combined filtrate of (b), followed by 250 parts of crystallized sodium acetate and then slowly, with stirring, by about 930 parts by volume of an aqueous 19% strength sodium carbonate solution until pH 5.6-6.0 has been established. The coupling reaction is completed by stirring at 18° to 20° C. for some hours. The reaction mixture is then heated to 65° C. and clarified by adding kieselguhr and by filtration. The filtrate is admixed with 1,500 parts of potassium chloride, and the precipitated disazo compound of the invention is filtered off with suction after 3 hours of stirring, is dried and is milled. This gives a yellow powder which contains about 677 parts of the potassium salt of the compound of the formula

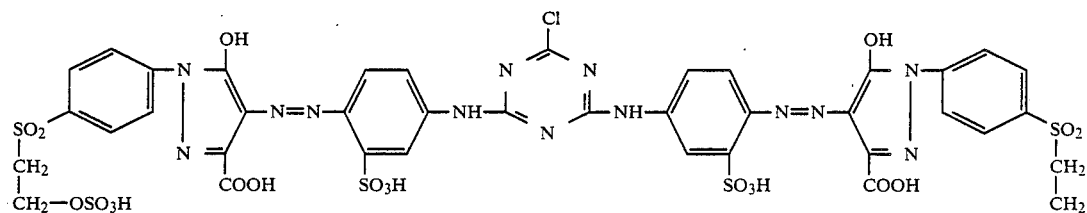

This disazo compound of the invention dyes, for example, cellulosic fiber materials by the methods customary for fiber-reactive dyestuff in yellowish orange shades of excellent fastness properties, of which the wash, perspiration, light, rubbing, water and seawater fastness properties are particularly noteworthy. The degrees of fixation obtained on dyeing and printing of cellulosic fiber materials are very high.

We claim:
1. A water-soluble compound of the formula

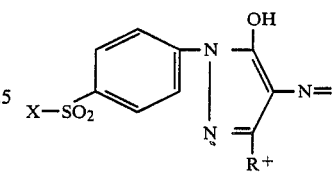

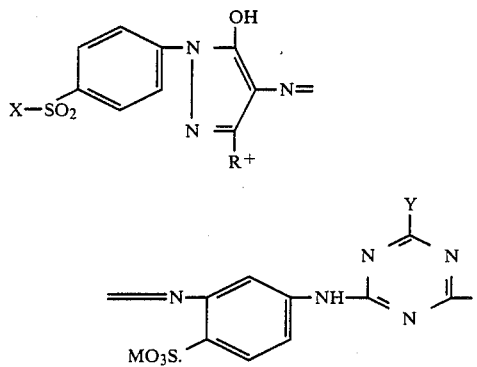

-continued

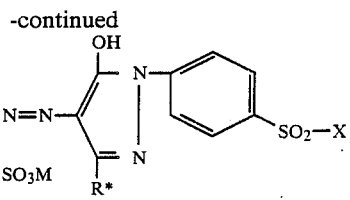

in which:
R+ is methyl, carboxy, or carbalkoxy of 2 to 5 carbon atoms,
R* is methyl, carboxy or carbalkoxy of 2 to 5 carbon atoms,
X is vinyl, β-sulfatoethyl, β-thiosulfatoethyl, or β-chloroethyl,
M is hydrogen or alkali metal or one equivalent of an alkaline earth metal, and
Y is chlorine, fluorine, or bromine.

2. A water-soluble disazo compound of the formula

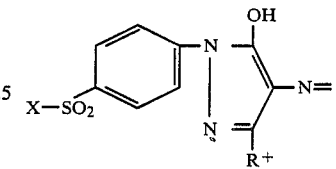

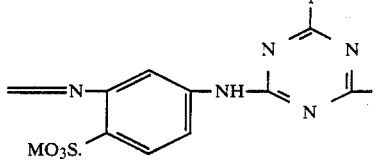

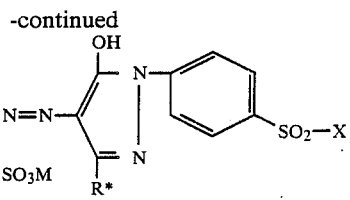

in which:
R+ is methyl, carboxy, carbomethoxy, or carbethoxy,
R* is methyl, carboxy, carbomethoxy, or carbethoxy,
X is vinyl, β-sulfatoethyl, β-thiosulfatoethyl, or β-chloroethyl,
M is hydrogen or alkali metal or one equivalent of an alkaline earth metal, and
Y is chlorine or fluorine.

3. A compound as claimed in claim 2, in which Y is chlorine.

4. A compound as claimed in claim 2, in which Y is fluorine.

5. A compound as claimed in claim 2, in which R+ and R* are carboxy or methyl.

6. A compound as claimed in claim 2, in which M is hydrogen, sodium, or potassium.

7. A compound as claimed in claim 2, in which R+ and R* are carboxy, and Y is chlorine.

8. A water-soluble disazo compound of the formula

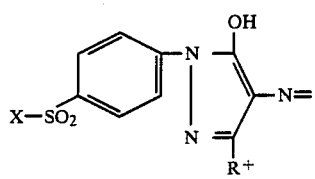

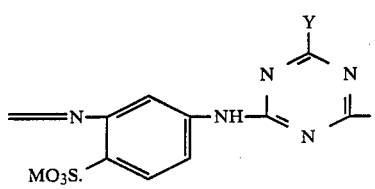

-continued

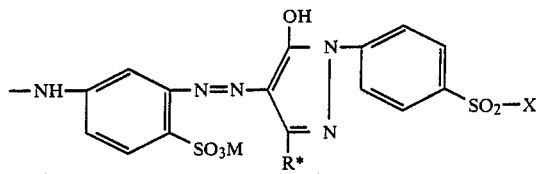

in which
R+ is methyl or carboxy,
R* is methyl or carboxy,
X is vinyl, β-sulfatoethyl, β-thiosulfatoethyl, or β-chloroethyl,
M is hydrogen or alkali metal or one equivalent of an alkaline earth metal, and
Y is chlorine or fluorine.

9. A compound as claimed in claim 8, in which Y is chlorine.

10. A compound as claimed in claim 8, in which Y is fluorine.

11. A compound as claimed in claim 8, in which M is hydrogen, sodium, or potassium.

* * * * *